United States Patent
Ko et al.

(10) Patent No.: US 11,395,246 B2
(45) Date of Patent: Jul. 19, 2022

(54) METHOD FOR TRANSMITTING OR RECEIVING SYSTEM INFORMATION AND APPARATUS THEREFOR

(71) Applicant: LG ELECTRONICS INC., Seoul (KR)

(72) Inventors: Hyunsoo Ko, Seoul (KR); Sukhyon Yoon, Seoul (KR); Youngsub Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 17/045,985

(22) PCT Filed: May 10, 2019

(86) PCT No.: PCT/KR2019/005627
§ 371 (c)(1),
(2) Date: Oct. 7, 2020

(87) PCT Pub. No.: WO2019/216690
PCT Pub. Date: Nov. 14, 2019

(65) Prior Publication Data
US 2021/0037488 A1     Feb. 4, 2021

Related U.S. Application Data

(60) Provisional application No. 62/670,041, filed on May 11, 2018.

(51) Int. Cl.
*H04W 56/00* (2009.01)
*H04W 72/00* (2009.01)
*H04W 72/04* (2009.01)

(52) U.S. Cl.
CPC ....... *H04W 56/001* (2013.01); *H04W 72/005* (2013.01); *H04W 72/0453* (2013.01); *H04W 72/0493* (2013.01)

(58) Field of Classification Search
None
See application file for complete search history.

(56) References Cited

U.S. PATENT DOCUMENTS

2018/0192383 A1* 7/2018 Nam ................. H04W 48/12
2019/0306832 A1* 10/2019 Si ......................... H04L 5/001

FOREIGN PATENT DOCUMENTS

| CN | 108012329 | 5/2018 |
| KR | 20180035719 | 4/2018 |

OTHER PUBLICATIONS

PCT International Application No. PCT/KR2019/005627, International Search Report dated Aug. 21, 2019, 18 pages.
(Continued)

*Primary Examiner* — Saba Tsegaye
(74) *Attorney, Agent, or Firm* — Lee Hong Degerman Kang Waimey

(57) ABSTRACT

Disclosed is a method for receiving remaining minimum system information (RMSI) by a terminal in a wireless communication system. In particular, the method comprises: receiving a synchronization signal/physical broadcast channel (SS/PBCH) block; acquiring information related to a control resource set (CORESET) from the SS/PBCH block; and receiving the RMSI through a region for a physical downlink shared channel (PDSCH) acquired on the basis of the CORESET, wherein when the first SS/PBCH block and the CORESET are multiplexed on the basis of multiplexing pattern 1, a time interval of the region for the PDSCH includes 2 symbols or 4 symbols.

12 Claims, 21 Drawing Sheets

(56) References Cited

OTHER PUBLICATIONS

LG Electronics, "RMSI delivery and CORESET configuration," R1-1719894, 3GPP TSG RAN WG1 Meeting#91, Dec. 2017, 18 pages.
Catt, "Remaining issues on PDSCH/PUSCH resource allocation," R1-1803757, 3GPP TSG RAN WG1 Meeting #92bis, Apr. 2018, 10 pages.
Catt, "Remaining Issues on RMSI," R1-1803730, 3GPP TSG RAN WG1 Meeting #92bis, Apr. 2018, 13 pages.

* cited by examiner (A) CONTROL-PLANE PROTOCOL STACK (B) USER-PLANE PROTOCOL STACK (a)

(b)

(a)

(b)

METHOD FOR TRANSMITTING OR RECEIVING SYSTEM INFORMATION AND APPARATUS THEREFOR

CROSS-REFERENCE TO RELATED APPLICATIONS

This application is the National Stage filing under 35 U.S.C. 371 of International Application No. PCT/KR2019/005627, filed on May 10, 2019, which claims the benefit of U.S. Provisional Application No. 62/670,041, filed on May 11, 2018, the contents of which are all hereby incorporated by reference herein in their entirety.

TECHNICAL FIELD

The present disclosure relates to a method and apparatus for transmitting and receiving system information, and more particularly, to a method and apparatus for allocating a physical downlink shared channel (PDSCH) region for remaining minimum system information (RMSI).

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An aspect of the present disclosure is to provide a method and apparatus for transmitting and receiving system information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving remaining minimum system information (RMSI) by a user equipment (UE) in a wireless communication system includes receiving a first synchronization signal/physical broadcast channel (SS/PBCH) block, obtaining information related to a control resource set (CORESET) from the first SS/PBCH block, and receiving RMSI in a region for a physical downlink shared channel (PDSCH) obtained based on the CORESET. When the first SS/PBCH block is multiplexed with the CORESET based on multiplexing pattern 2, a time period of the region for the PDSCH spans two or four symbols.

A first frequency area for the PDSCH may include a second frequency area for the first SS/PBCH block, and a third frequency area for the CORESET.

Further, the RMSI may be received in a time area in which no SS/PBCH block is transmitted in a time area included in the second frequency area.

Further, a specific frequency gap may be allocated between the second frequency area and the third frequency area.

Further, the first frequency area may be an initial active downlink bandwidth part.

Further, a first symbol of the first SS/PBCH block may be identical to a starting symbol of the PDSCH.

Further, the time period of the region for the PDSCH may include at least one symbol associated with the first SS/PBCH block and at least one symbol associated with a second SS/PBCH block which is not actually transmitted.

Further, an index of the first SS/PBCH block and an index of the second SS/PBCH block may be contiguous to each other.

Further, the UE is communicable with at least one of another UE, a network, a base station, or an autonomous driving vehicle.

In another aspect of the present disclosure, an apparatus for receiving RMSI in a wireless communication system includes at least one processor, and at least one memory operatively coupled to the at least one processor and storing instructions which when executed by the at least one processor, cause the at least one processor to perform a specific operation. The specific operation includes receiving an SS/PBCH block, obtaining information related to a CORESET from the SS/PBCH block, and receiving RMSI in a region for a PDSCH obtained based on the CORESET. When the SS/PBCH block is multiplexed with the CORESET based on multiplexing pattern 2, a time period of the region for the PDSCH spans two or four symbols.

In another aspect of the present disclosure, a UE for receiving RMSI in a wireless communication system includes at least one transceiver, at least one processor, and at least one memory operatively coupled to the at least one processor and storing instructions which when executed by the at least one processor, cause the at least one processor to perform a specific operation. The specific operation includes receiving an SS/PBCH block through the at least one transceiver, obtaining information related to a CORESET from the SS/PBCH block, and receiving RMSI in a region for a PDSCH obtained based on the CORESET through the at least one transceiver. When the SS/PBCH block is multiplexed with the CORESET based on multiplexing pattern 2, a time period of the region for the PDSCH spans two or four symbols.

In another aspect of the present disclosure, a method of transmitting RMSI by a BS in a wireless communication system includes transmitting an SS/PBCH block including information related to a CORESET, and transmitting RMSI in a region for a PDSCH scheduled based on the CORESET. When the first SS/PBCH block is multiplexed with the CORESET based on multiplexing pattern 2, a time period of the region for the PDSCH spans two or four symbols.

In another aspect of the present disclosure, a BS for transmitting RMSI in a wireless communication system includes at least one transceiver, at least one processor, and at least one memory operatively coupled to the at least one processor and storing instructions which when executed by the at least one processor, cause the at least one processor to perform a specific operation. The specific operation includes transmitting an SS/PBCH block including information related to a CORESET through the at least one transceiver, and transmitting RMSI in a region for a PDSCH scheduled based on the CORESET through the at least one transceiver. When the first SS/PBCH block is multiplexed with the CORESET based on multiplexing pattern 2, a time period of the region for the PDSCH spans two or four symbols.

Advantageous Effects

According to the present disclosure, a larger physical downlink shared channel (PDSCH) region may be allocated for remaining minimum system information (RMSI), thereby bringing efficiency to RMSI transmission and reception.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
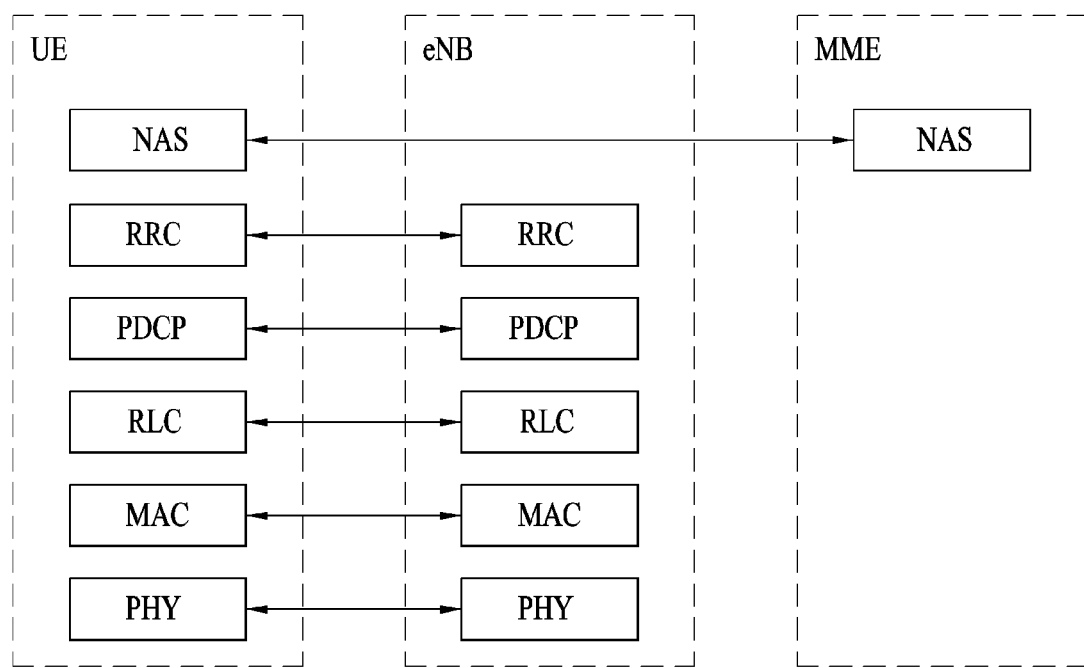
FIG. 1 is a diagram illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.
Figure 1:
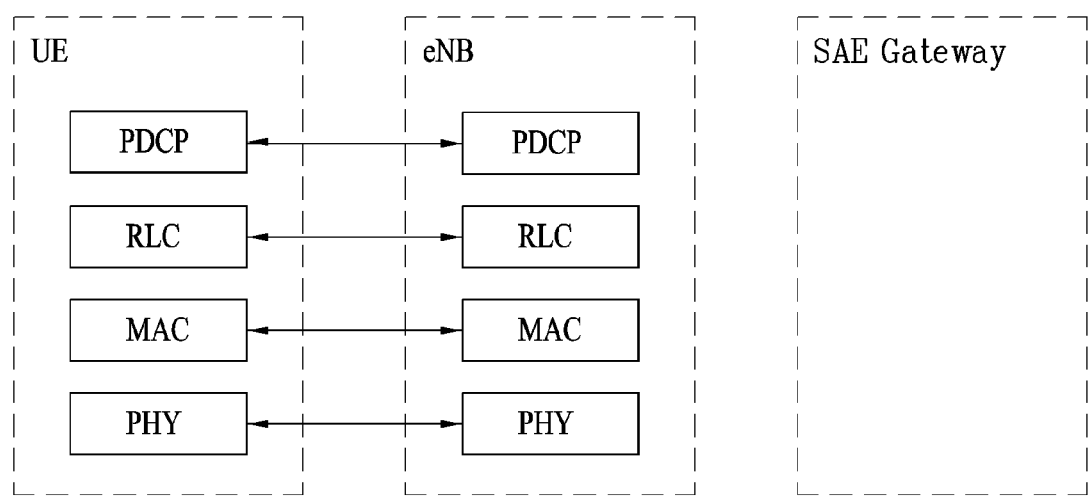

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key perform ance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
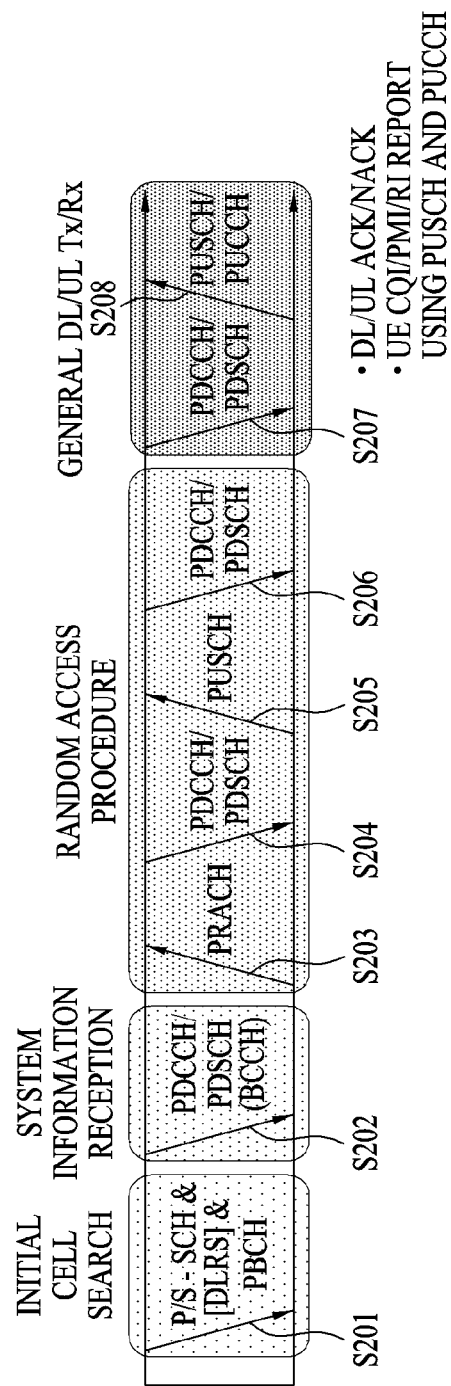
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters anew cell, the UE performs initial cell search (S201). The initial cell search involves acquisition of synchronization to an eNB. Specifically, the UE synchronizes its timing to the eNB and obtains a cell identifier (ID) and other information by receiving a primary synchronization channel (P-SCH) and a secondary synchronization channel (S-SCH) from the eNB. Then the UE may obtain information broadcast in the cell by receiving a physical broadcast channel (PBCH) from the eNB. During the initial cell search, the UE may monitor a DL channel state by receiving a downlink reference signal (DL RS).

After the initial cell search, the UE may obtain detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
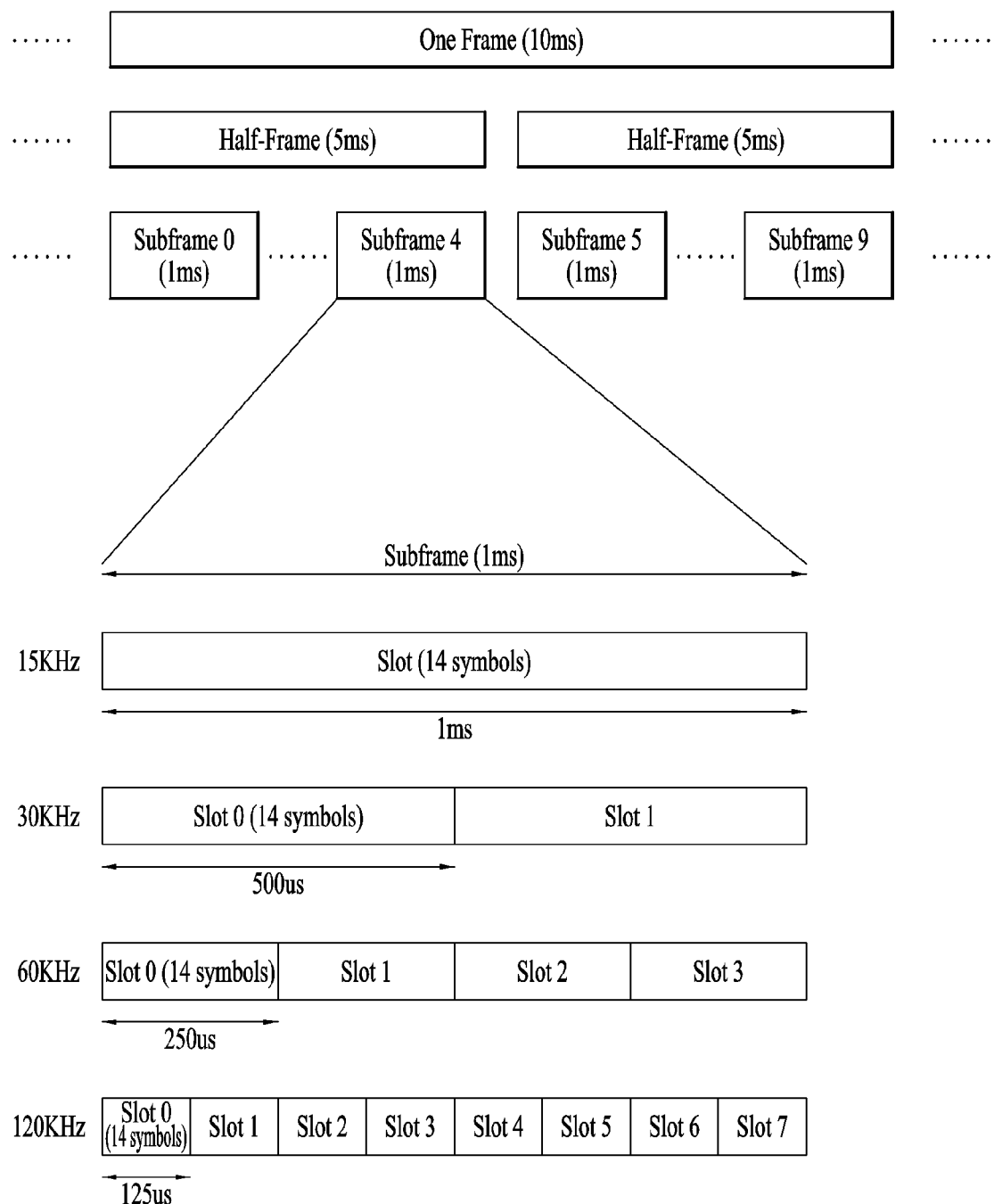
FIGS. 3, 4 and 5 are diagrams illustrating structures of a radio frame and slots used in a new radio access technology (NR) system.

FIG. 3 illustrates a structure of a radio frame used in NR.

In NR, UL and DL transmissions are configured in frames. The radio frame has a length of 10 ms and is defined as two 5 ms half-frames (HF). A half-frame is defined as five 1-ms subframes (SFs). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |

TABLE 1-continued

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot $N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
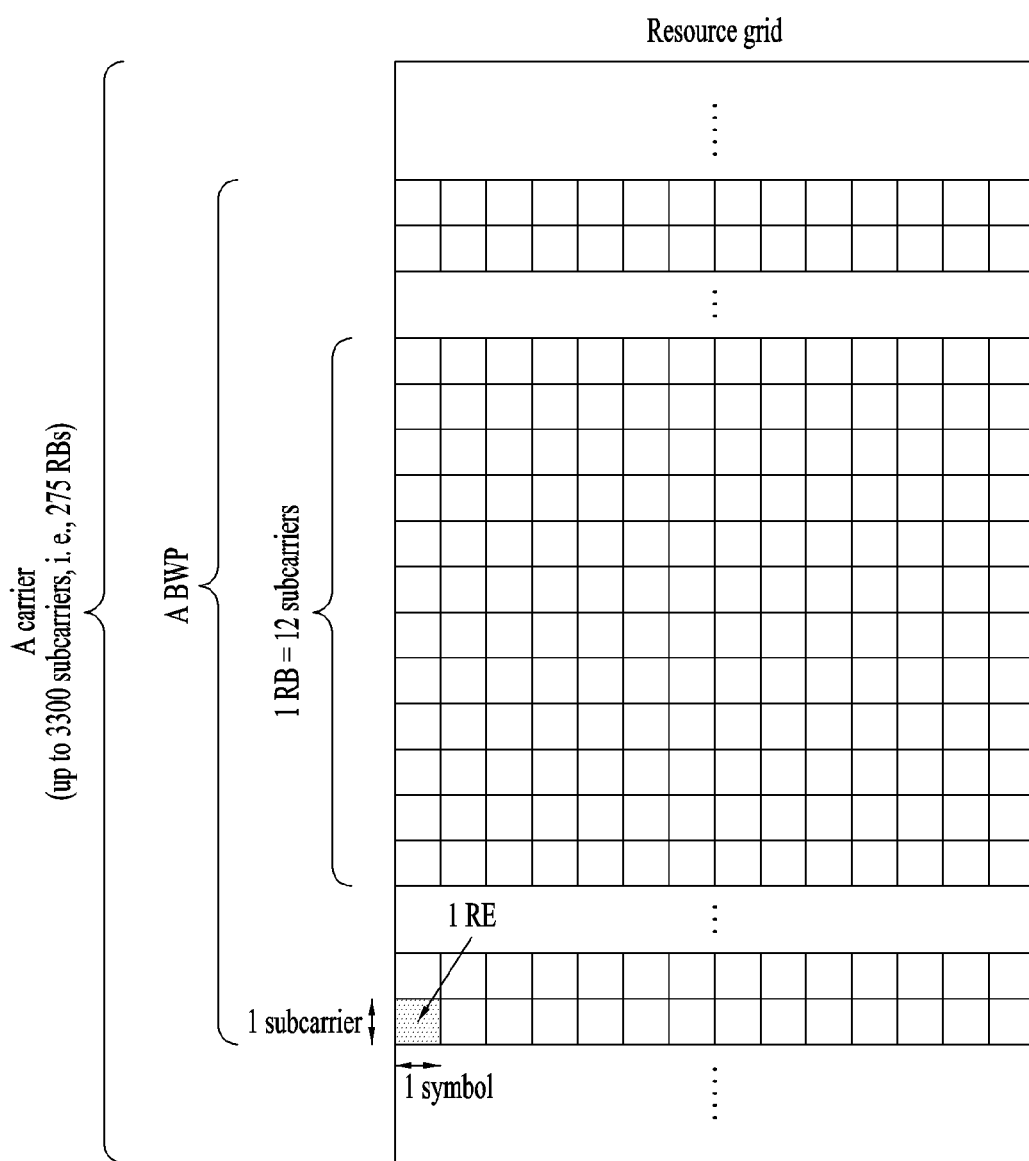

FIG. 4 illustrates an exemplary slot structure for an NR frame. A slot includes a plurality of symbols in the time domain. For example, one slot includes 7 symbols in a normal CP case and 6 symbols in an extended CP case. A carrier includes a plurality of subcarriers in the frequency domain. A resource block (RB) is defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., a subcarrier spacing (SCS), a CP length, or the like). A carrier may include up to N (e.g., 5) BWPs. Data communication may be performed in an active BWP, and only one BWP may be activated for one UE. Each resource in a resource grid is referred to as a resource element (RE) and may be mapped to one complex symbol.

Figure 5:
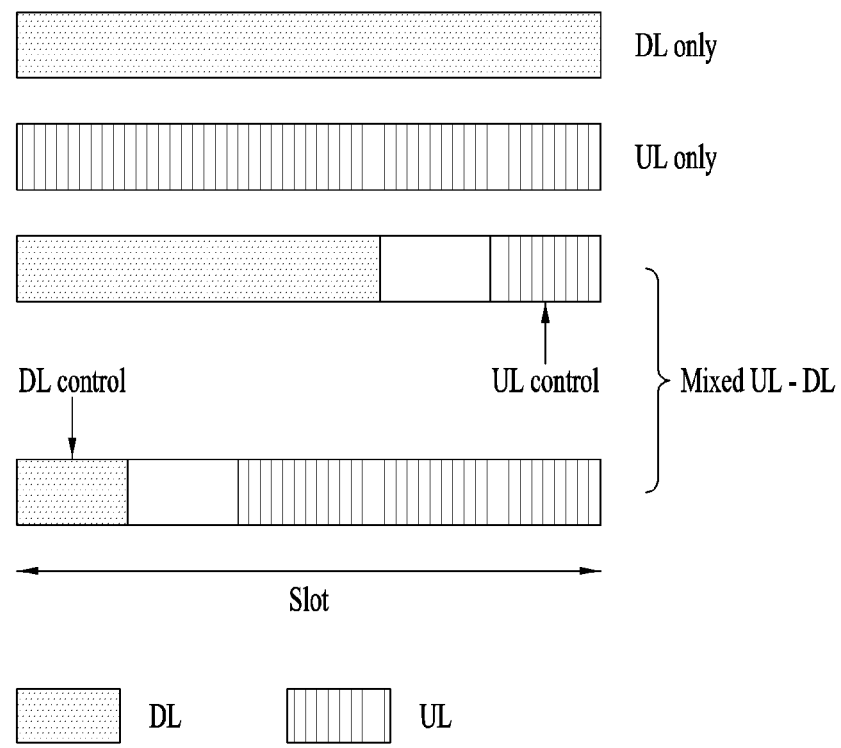

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
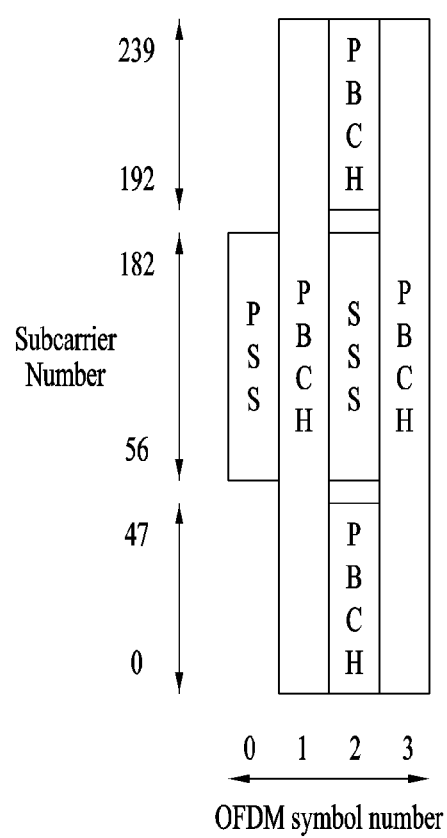
FIG. 6 is a diagram illustrating a structure of a synchronization signal (SS)/physical broadcast channel (PBCH) block used in the NR system.

FIG. 6 illustrates an SSB structure. The UE may perform cell search, system information acquisition, beam alignment for initial connection, DL measurement, etc. based on the SSB. The SSB is used interchangeably with the synchronization signal/physical broadcast channel (SS/PBCH) block.

Referring to FIG. 6, an SSB is composed of a PSS, a SSS and a PBCH. The SSB is composed of four consecutive OFDM symbols. The PSS, the PBCH, the SSS/PBCH and the PBCH are transmitted on each OFDM symbol, respectively. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH is composed of a data RE and a demodulation reference signal (DMRS) RE for each OFDM symbol. There are three DMRS REs per RB, and there are three data REs between the DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as shown in Table 3 below.

[Table 3]

TABLE 3

| | Type of Signals | Operations |
|---|---|---|
| $1^{st}$ step | PSS | SS/PBCH block (SSB) symbol timing acquisition Cell ID detection within a cell ID group (3 hypothesis) |
| $2^{nd}$ Step | SSS | Cell ID group detection (336 hypothesis) |
| $3^{rd}$ Step | PBCH DMRS | SSB index and Half frame (HF) index (Slot and frame boundary detection) |
| $4^{th}$ Step | PBCH | Time information (80 ms, System Frame Number (SFN), SSB index, HF) Remaining Minimum System Information (RMSI) Control resource set (CORESET)/Search space configuration |
| $5^{th}$ Step | PDCCH and PDSCH | Cell access information RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 7:
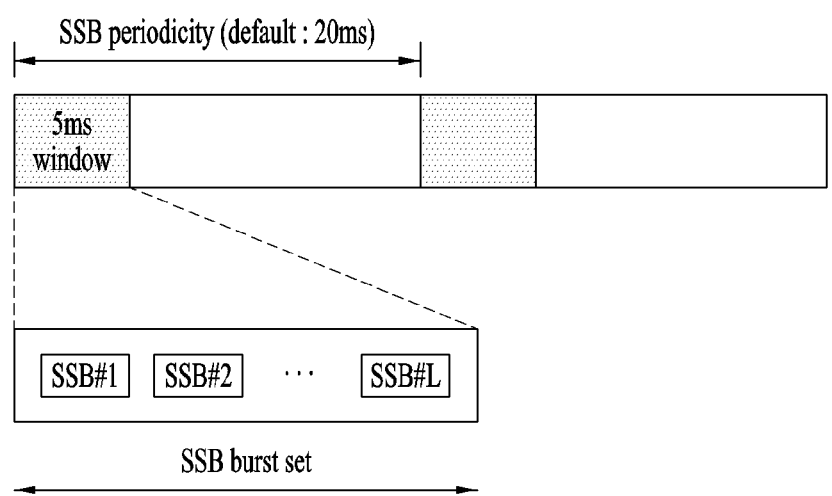
FIG. 7 is a diagram illustrating SS/PBCH block transmission in the NR system.

FIG. 7 illustrates SSB transmission. Referring to FIG. 7, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 8:
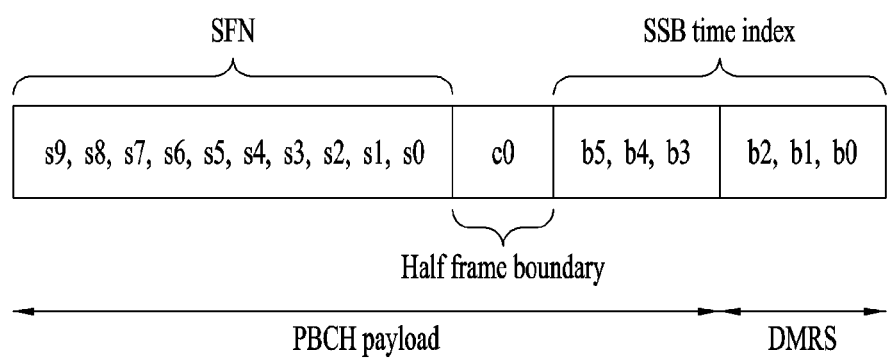
FIG. 8 is a diagram illustrating a method of transmitting information about downlink time synchronization in the NR system.

FIG. 8 illustrates acquisition of DL time synchronization information at a UE. Referring to FIG. 8, the UE may obtain DL synchronization by detecting an SSB. The UE may identify the structure of an SSB burst set based on the index of the detected SSB and thus detect a symbol, slot, or half-frame boundary. The number of a frame or half-frame to which the detected SSB belongs to may be identified by SFN information and half-frame indication information.

Specifically, the UE may obtain 10-bit SFN system information s0 to s9 from the PBCH. 6 bits out of the 10-bit SFN information is obtained from a master information block (MIB), and the remaining 4 bits are obtained from a PBCH transport block (TB).

The UE may then obtain 1-bit half-frame indication information c0. When a carrier frequency is 3 GHz or below, the half-frame indication information may be signaled implicitly by a PBCH DMRS. The PBCH DMRS uses one of 8 PBCH DMRS sequences to indicate 3-bit information. Therefore, when L=4, the remaining one bit except for bits indicating an SSB index among 3 bits that may be indicated by the 8 PBCH DMRS sequences may be used as a half-frame indication.

Finally, the UE may obtain an SSB index based on the DMRS sequence and PBCH payload. SSB candidates are indexed with 0 to L−1 in time order in an SSB burst set (i.e., half-frame). When L=8 or L=64, three least significant bits (LSBs) b0, b1 and b2 of an SSB index may be indicated by 8 different PBCH DMRS sequences. When L=64, three most significant bits (MSBs) b3, b4 and b5 of the SSB index are indicated by the PBCH. When L=2, two LSBs b0 and b1 of the SSB index may be indicated by 4 different PBCH DMRS sequences. When L=4, the remaining one bit b2 except for the bits indicating the SSB index among the three bits may be used as a half-frame indication.

Figure 9:
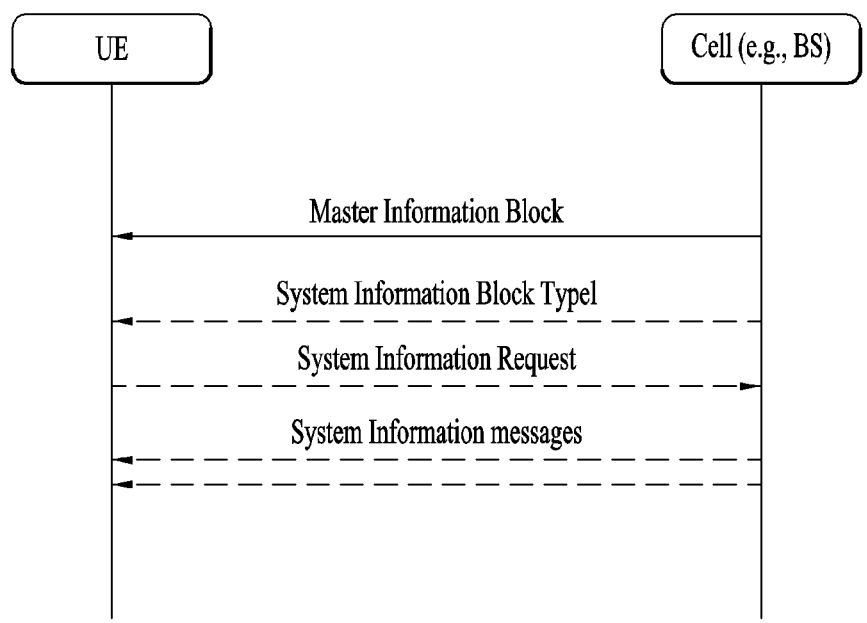
FIG. 9 is a diagram illustrating a system information acquisition process in the NR system.

FIG. 9 illustrates a system information (SI) acquisition procedure. The UE may obtain access stratum (AS)-/non-access stratum (NAS)-information in the SI acquisition procedure. The SI acquisition procedure may be applied to UEs in RRC_IDLE, RRC INACTIVE, and RRC CONNECTED states.

SI is divided into a master information block (MIB) and a plurality of system information blocks (SIBs). The MIB and the plurality of SIBs are further divided into minimum SI and other SI. The minimum SI may include the MIB and systemInformationBlock1 (SIB1), carrying basic information required for initial access and information required to obtain the other SI. SIB1 may also be referred to as remaining minimum system information (RMSI). For details, the following may be referred to.

- The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.
- SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.
- SIBx is included in an SI message and transmitted on a PDSCH. Each SI message is transmitted within a periodic time window (i.e., SI-window).

Figure 10:
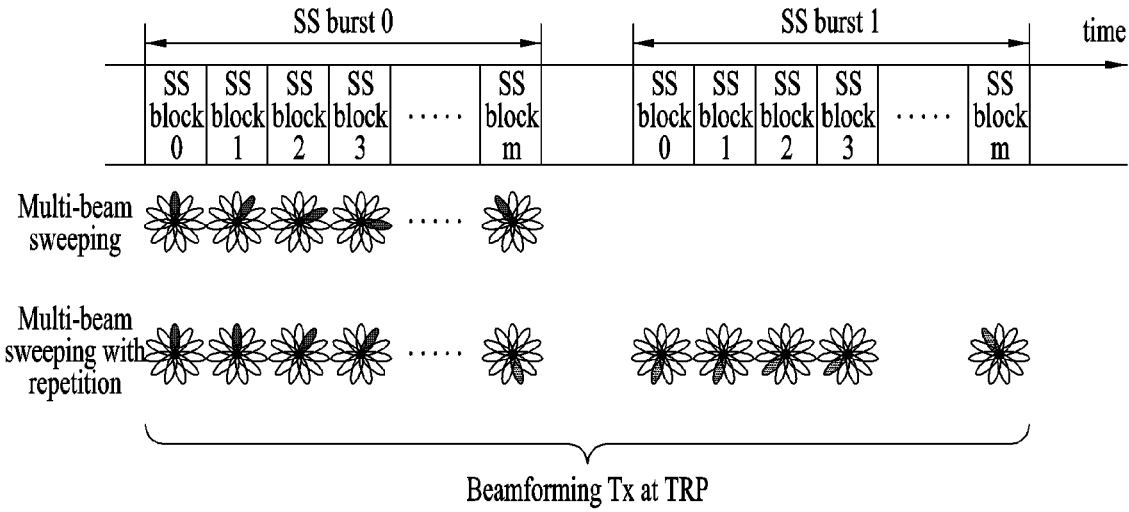
FIG. 10 is a diagram illustrating multi-beam transmission of an SS/PBCH block.

FIG. 10 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

- For frequency range of up to 3 GHz, maximum number of beams=4
- For frequency range from 3 GHz to 6 GHz, maximum number of beams=8
- For frequency range from 6 GHz to 52.6 GHz, maximum number of beams=64
- Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Figure 11:
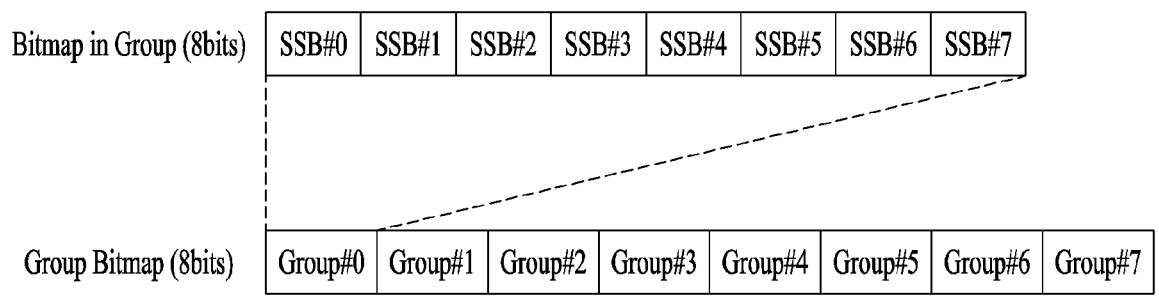
FIG. 11 is a diagram illustrating an example of indicating an actual transmitted SS/PBCH block.

FIG. 11 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

Figure 13:
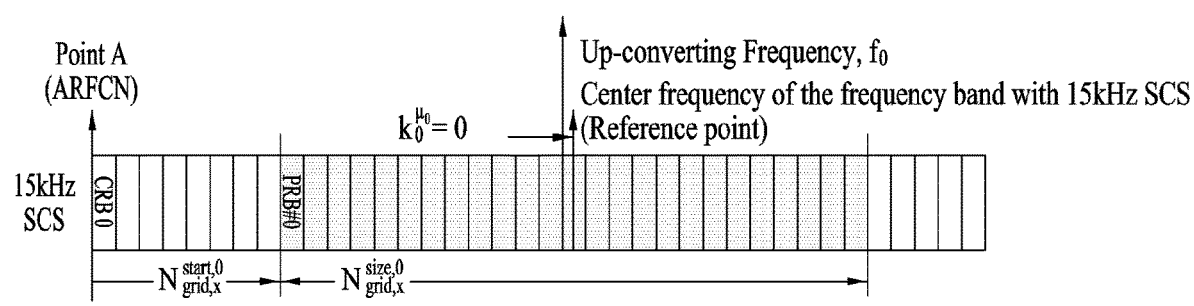

- If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated in FIG. 13. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.
- If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

Embodiment 1: Generation of OFDM Baseband Signal

A variable $k_0''$ for OFDM baseband signal generation may be calculated by the following [Equation 1], which is an OFDM signal generation formula used to define a frequency offset between the center frequencies of frequency bands with different numerologies in one cell, rather than the variable $k_0^\mu$ is obtained from a higher-layer parameter k0 for PRB alignment. As noted from [Equation 1], the parameter $k_0^\mu$ may also be derived from the center frequency of a frequency bandwidth with a maximum SCS $u_0$ configured by a higher-layer signal.

$$k_0^\mu = N_{grid,x}^{start,\mu} \cdot N_{sc}^{RB} + \frac{N_{grid,x}^{size,\mu}}{2} \cdot N_{sc}^{RB} - \left( N_{grid,x}^{size,\mu_0} \cdot N_{sc}^{RB} + \frac{N_{grid,x}^{size,\mu_0}}{2} \cdot N_{sc}^{RB} - k_0^{\mu_0} \right) \cdot 2^{\mu_0 - \mu}$$
[Equation 1]

In [Equation 1], the variables $\mu$, $N_{grid,x}^{start,\mu}$, $N_{grid,x}^{size,\mu}$, $\mu_0$, $N_{grid,x}^{start,\mu_0}$, and $N_{grid,x}^{size,\mu_0}$ may be provided from a cell-specific parameter FrequencyInfoDL of an RRC signal. $\mu$ and $\mu_0$ represent different numerologies (i.e., SCSs), and $N_{grid,x}^{start,\mu}$ and $N_{grid,x}^{start,\mu_0}$ represent the spacings between common resource blocks (CRBs) #0 corresponding to the numerologies and PRBs #0 for baseband signals. $N_{grid,x}^{size,\mu}$ and $N_{gird}^{size,\mu_0}$ represent the sizes of PRBs for the baseband signals corresponding to the respective numerologies.

When the center frequency of the frequency band with the maximum SCS in the cell is defined as a reference point for deriving a frequency offset, the value of $k_0^{\mu_0}$ may be '0'.

Figure 12:
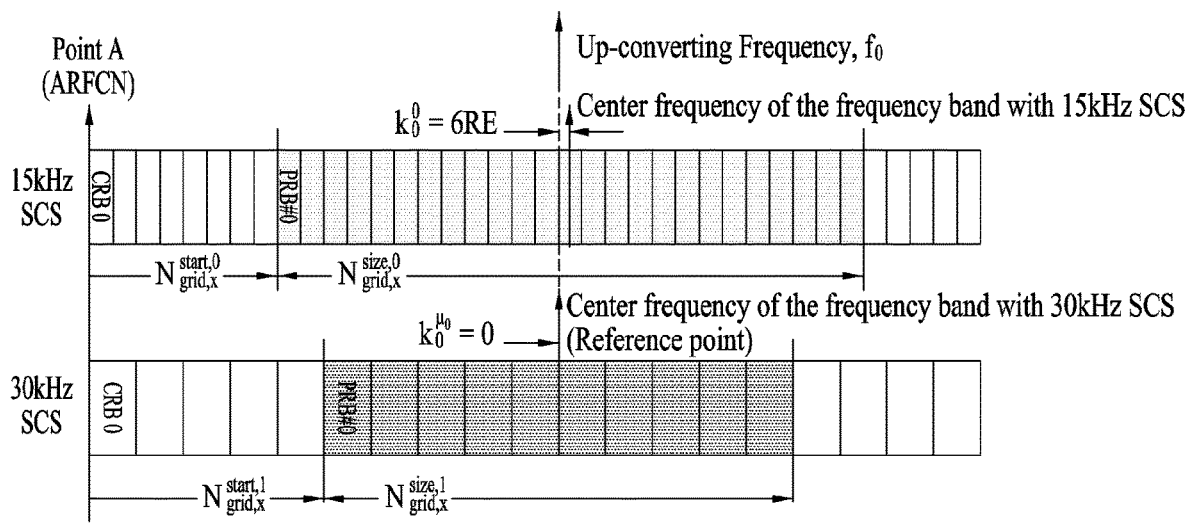
FIGS. 12 and 13 are diagrams illustrating an example of generating an orthogonal frequency division multiplexing (OFDM) baseband signal.

FIG. 12 illustrates an exemplary frequency offset between the center frequencies of frequency hands with different SCSs such as 15 kHz and 30 kHz.

As illustrated in FIG. 12, it is assumed that the center frequency of the frequency band with the 30-kHz SCS is a reference point for deriving a frequency offset $k_0^\mu$. Accordingly, the value of a frequency offset $k_0^{\mu_0}$ may be set to '0'. A frequency offset $k_0^0$ between the reference point and the center frequency of the frequency band with the 15-kHz SCS is 6 REs (=90 kHz).

It is also assumed in FIG. 12 that an up-converting frequency $f_0$ is aligned with the center frequency of the frequency band with the 30-kHz SCS. In this case, the center frequency of the frequency band with the 15-kHz SCS is not aligned with the up-converting frequency $f_0$. However, the UE does not need to perform radio frequency (RF) readjustment to eliminate the frequency offset mismatch. This is because a digital oscillator or a fast Fourier transform (FFT) shift may be used for a residual frequency shift for the up-converting frequency $f_0$ in addition to up-conversion through an analog oscillator. Further, the residual frequency shift may be achieved in terms of UE implementation.

In a multi-cell environment, each cell may have a different maximum SCS. That is, when a serving cell and a target cell have different maximum SCSs in handover, the center frequency of a frequency band with a maximum SCS, that is, the reference point may be changed. In this case, the reference point may not be aligned with the up-converting frequency $f_0$ as illustrated in FIG. 13. However, the UE may use a digital oscillator or an FFT shift for a residual frequency shift, which obviates the need for RF readjustment, as described above.

Embodiment 2: Timing Information about Target Cell

Timing information such as an SFN, a half-frame index, and an SS/PBCH block index is included in PBCH contents. Therefore, the UE may obtain the timing information by decoding a PBCH. Particularly during handover, the UE should be able to obtain at least information about a frame boundary from timing information about a target cell because a frame structure and signals are defined within 10 ms, such as a slot number, a scrambling sequence, a DMRS sequence, and a CSI-RS sequence. Accordingly, although the UE needs to decode the PBCH to obtain half-frame information about the target cell, a PBCH decoding time increases latency.

Therefore, there is a need for a method of obtaining half-frame information without attempting PBCH decoding for a target cell during handover by a UE.

Up to four SS/PBCH blocks may be transmitted in a frequency band at 3 GHz or below, and one of three bits used to indicate an SS/PBCH block index included in a PBCH DMRS may be used to indicate a half-frame. Therefore, the UE may detect a PBCH DMRS sequence of the target cell at or below 3 GHz to obtain half-frame information about the target cell.

However, a method of obtaining frame boundary information and/or half-frame boundary information about a target cell without PBCH decoding in a frequency area at or above 3 GHz needs to be developed.

Figure 14:
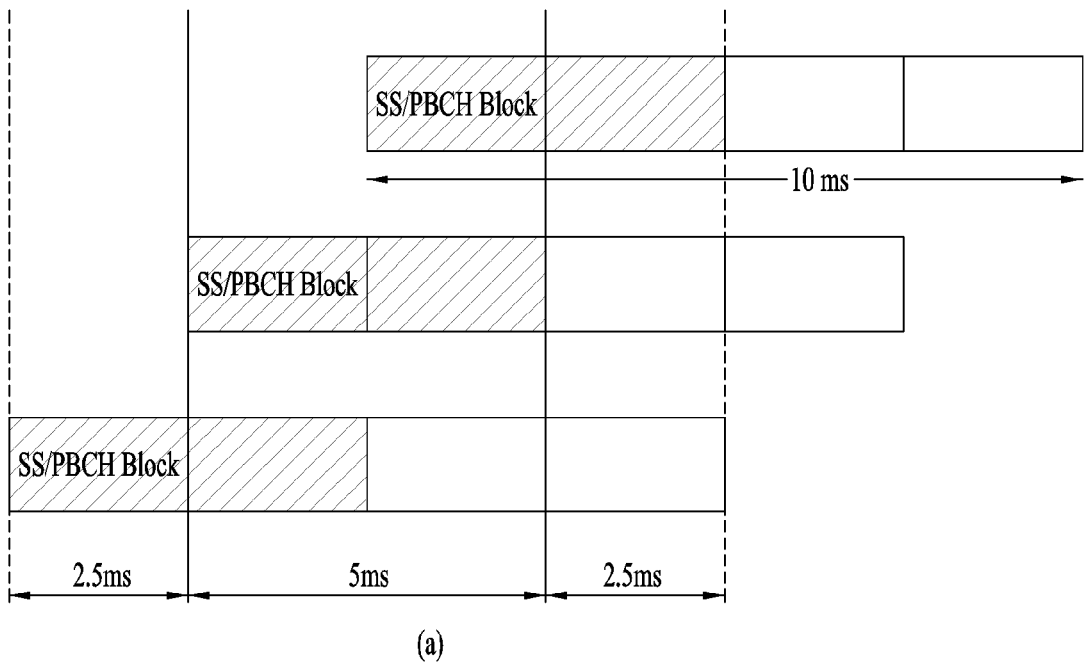
FIG. 14 is a diagram illustrating an example of obtaining timing information about a target cell.
Figure 14:
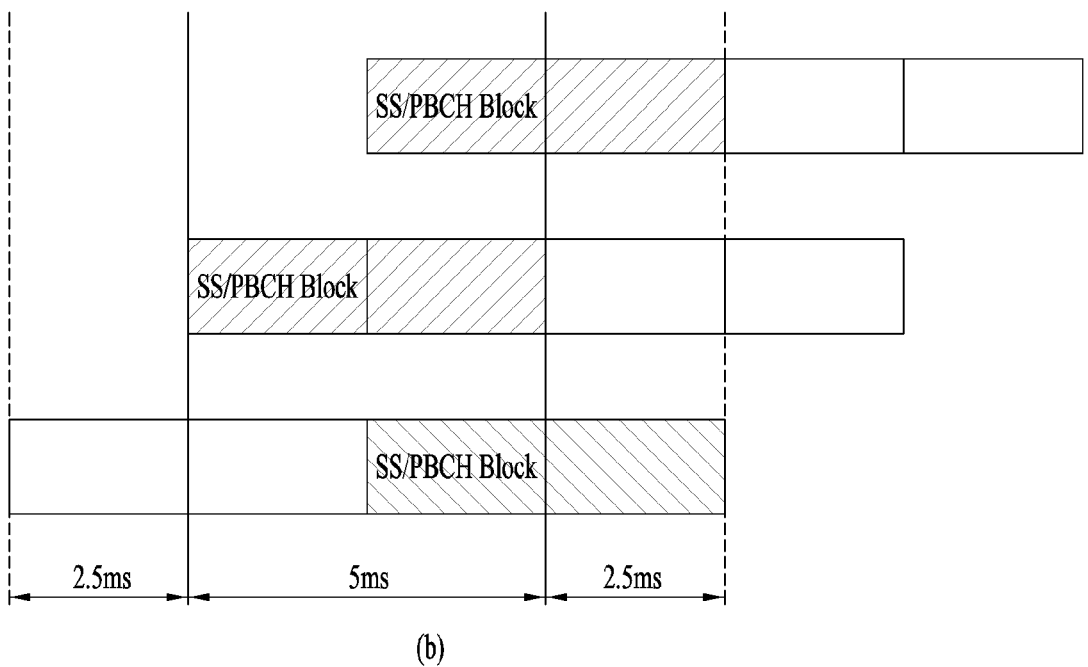

For this purpose, the BS may assume that the serving cell and the target cell are tightly synchronized with each other within 2.5 ms. In this case, as illustrated in FIG. 14(a), when SS/PBCH blocks are transmitted only in a first half-frame or only in a second half-frame, the UE may assume that frame boundaries are aligned between the serving cell and the target cell.

In fact, however, the UE may face ambiguity about a frame boundary because SS/PBCH blocks may be transmitted in the first or second half-frame, as illustrated in FIG. 14(b). To eliminate the ambiguity, the UE may assume that the SS/PBCH block of the target cell (or neighbor cell) and the SS/PBCH block of the serving cell are transmitted in the same half-frame. For example, when the SS/PBCH block of the serving cell is transmitted in the first half-frame, the UE may expect transmission of the SS/PBCH block of the target cell in the first half-frame. Likewise, when the SS/PBCH block of the serving cell is transmitted in the second half-frame, the UE may expect transmission of the SS/PBCH block of the target cell in the second half-frame.

As describe before, the assumption that the serving cell and the target cell are tightly synchronized with each other within 2.5 ms or SS/PBCH blocks are transmitted only in the first half-frame or only in the second half-frame may limit network operations.

However, if a flexible network operation or a relaxed network synchronization assumption is important in the NR system, it is necessary to consider another method of obtaining half-frame information about a target cell (or neighbor cell). To this end, CSI-RS resources may be allocated around an actually transmitted SS/PBCH block (ATSS). Since a CSI-RS sequence is initialized by a cell ID and a slot number in a frame, the UE may obtain the slot number by detecting the CSI-RS sequence. For example, when the BS configures CSI-RS resources around an SS/PBCH block, the UE may detect a correlation property based on CSI-RS sequences configured at two candidate positions in a frame. The two candidate positions in the frame refer to two half-frames included in the frame, which may be a first half-frame and a second half-frame.

Embodiment 3: PBCH Contents for Configuring RMSI CORESET with Minimum Bandwidth of 10 MHz When the SCS of an SS/PBCH block is 30 kHz, a configuration table for a band with a minimum channel bandwidth (MinCBW) of 40 MHz has been reflected in the standard. However, since the details of a synchronization raster are yet to be decided, whether to reflect a new configuration table for a 15-kHz SCS of an SS/PBCH block and a 10-MHz MinCBW in the standard needs to be discussed.

A synchronization raster separation has been changed from 900 kHz to 1200 kHz for an LTE re-farming band. The 1200-kHz synchronization raster separation may also be applied to an NR band at or below 3 GHz. In order to reduce the number of synchronization raster entries for a wide MinCBW (i.e., 10 MHz or 40 MHz), the number of all candidate synchronization raster entries may be reduced. Accordingly, since the step size for this is 9 and the synchronization raster separation is 1200 kHz, an effective synchronization raster separation for Band n41 may be 3600 kHz.

Because the synchronization raster separation value of Band n41 with the 10-MHz MinCBW is larger than the synchronization raster separation value of a band with a 5-MHz MinCBW, an existing RMSI CORESET configuration table for the 5-MHz MinCBW may not support Band n41.

Therefore, a method of configuring an RSMI CORESET to support Band n41 needs to be considered. If the existing step size value of Band n41 is not changed, a new configuration table supporting Band n41 should be made.

Among frequency bands at or below 6 GHz, Band n41 may overlap with Band n7 and Band n38. For example, Band n7 may range from 2622.6 MHz to 2687.4 MHz. Band n38 may range from 2572.2 MHz to 2687.4 MHz, and Band n41 may range from 2499.36 MHz to 2686.56 MHz.

The BS may apply an appropriate RMSI CORESET configuration table to each band according to a MinCBW. For example, the RMSI CORESET configuration table for the 10-MHz MinCBW may be used for Band n41, whereas the RMSI CORESET configuration table for the 5-MHz MinCBW may be applied to Band n7 and Band n38. However, without knowledge of a band number for a configuration table used by the BS in a band where Band n41 and Band {n7, n38} overlap during initial access, the UE may not identify an applied configuration table. To solve this problem, a 1-bit indicator indicating MinCBW information may be included in PBCH contents in frequency range 1 (FR1). a reserved bit for an SS/PBCH block index, such as $a_{\bar{A}+3}$ or $a_{\bar{A}+4}$, may be used as the 1-bit indicator. To support a wider synchronization raster separation, an RMSI CORESET configuration indicated in 5 bits may be considered by adding 1 bit to an existing RMSI CORESET configuration indicated in 4 bits. For the added 1 bit, the reserved bit for the SS/PBCH block index may also be used, as described above.

Embodiment 4: RMSI CORESET Configuration Table for 5-MHz MinCBW in 15-MHz SCS The current RMSI CORESET configuration table was designed for the 900-kHz synchronization raster separation for the 5-MHz MinCBW. However, because the synchronization raster separation has been changed from 900 kHz to 1200 kHz, offsets should be added to the current RMSI CORESET configuration table to support the wider synchronization raster separation. The table with additional offsets is given below.

TABLE 4

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 6 |
| 1 | 1 | 24 | 2 | 7 |
| 2 | 1 | 24 | 2 | 8 |
| 3 | 1 | 24 | 2 | 9 |
| 4 | 1 | 24 | 3 | 6 |
| 5 | 1 | 24 | 3 | 7 |
| 6 | 1 | 24 | 3 | 8 |
| 7 | 1 | 24 | 3 | 9 |
| 8 | 1 | 48 | 1 | 18 |
| 9 | 1 | 48 | 1 | 20 |
| 10 | 1 | 48 | 2 | 18 |
| 11 | 1 | 48 | 2 | 20 |
| 12 | 1 | 48 | 3 | 18 |
| 13 | 1 | 48 | 3 | 20 |
| 14 | Reserved | | | |
| 15 | Reserved | | | |

The additional entries of [Table 4] are as follows.
1) Number of RBs: 24, Number of Symbols: 2, Offset: 9
2) Number of RBs: 24, Number of Symbols: 3, Offset: 9

Embodiment 5: RMSI CORESET Configuration Table for 10-MHz MinCBW in 15-MHz SCS The same synchronization raster separation is used for all bands at or below 3 GHz. Therefore, for a frequency band at or below 3 GHz, overlapping bands between the LTE re-farming band {n7, n38} and the NR band {n41} share a global synchronization raster channel (GSCN). Accordingly, for band {n41}, the synchronization raster separation may be changed from 1440 kHz to 1200 kHz, and the step size may be changed from <3> to <9> to reduce the number of entries. An effective synchronization raster separation for band {n41} may be 3600 kHz according to the step size for reduction of the number of entries and the synchronization raster separation.

The current CORESET configuration table for the 15-kHz SCS SS/PBCH block with the 5-MHz MinCBW is not suitable for indicating an RB offset between an SS/PBCH block and an RMSI CORESET. For example, if the RB offset between the SS/PBCH block and the RMSI CORESET is 3600 kHz, the current CORESET configuration table is not suitable. Therefore, it is necessary to define a new RMSI CORESET configuration table with the 15-kHz SCS for an SS/PBCH block having the 10-MHz MinCBW.

For example, to support a wider synchronization raster separation, a 5-bit configuration table should be designed. As described above, a reserved bit for an SS/PBCH block index may be used for an additional bit. In other words, $a_{\bar{A}+3}$ or $a_{\bar{A}+4}$ reserved for SS/PBCH block index indication in PBCH contents may be used.

Examples of the new configuration table may be given as [Table 5] to [Table 8]. In [Table 5] to [Table 8], it is considered that a 4800-kHz synchronization raster separation may be used and the step size for reducing the number of entries may be changed to <12>. [Table 5] and [Table 6] are examples for a 5.6-MHz synchronization raster. Specifically, [Table 5] is for a 15-kHz PDCCH SCS, and [Table 6] is for a 30-kHz PDCCH SCS.

[Table 7] and [Table 8] are examples for a 4.8-MHz synchronization raster. Specifically, [Table 7] is for the 15-kHz PDCCH SCS, and [Table 8] is for the 30-kHz PDCCH SCS.

TABLE 5

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 1 | 6 |
| 1 | 1 | 48 | 1 | 11 |
| 2 | 1 | 48 | 1 | 16 |
| 3 | 1 | 48 | 1 | 21 |
| 4 | 1 | 48 | 2 | 6 |
| 5 | 1 | 48 | 2 | 11 |
| 6 | 1 | 48 | 2 | 16 |
| 7 | 1 | 48 | 2 | 21 |
| 8 | 1 | 48 | 3 | 6 |
| 9 | 1 | 48 | 3 | 11 |
| 10 | 1 | 48 | 3 | 16 |
| 11 | 1 | 48 | 3 | 21 |
| 12 | 1 | 96 | 1 | 32 |
| 13 | 1 | 96 | 1 | 43 |
| 14 | 1 | 96 | 2 | 32 |
| 15 | 1 | 96 | 2 | 43 |
| 16 | 1 | 96 | 3 | 32 |
| 17 | 1 | 96 | 3 | 43 |
| 18 | Reserved | | | |
| 19 | Reserved | | | |
| 20 | Reserved | | | |
| 21 | Reserved | | | |
| 22 | Reserved | | | |
| 23 | Reserved | | | |
| 24 | Reserved | | | |
| 25 | Reserved | | | |
| 26 | Reserved | | | |
| 27 | Reserved | | | |
| 28 | Reserved | | | |
| 29 | Reserved | | | |
| 30 | Reserved | | | |

TABLE 6

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 1 | 3 |
| 1 | 1 | 24 | 1 | 4 |
| 2 | 1 | 24 | 1 | 5 |
| 3 | 1 | 24 | 1 | 6 |
| 4 | 1 | 24 | 1 | 7 |
| 5 | 1 | 24 | 1 | 8 |
| 6 | 1 | 24 | 1 | 9 |
| 7 | 1 | 24 | 1 | 10 |
| 8 | 1 | 24 | 1 | 11 |
| 9 | 1 | 24 | 1 | 12 |
| 10 | 1 | 24 | 2 | 3 |
| 11 | 1 | 24 | 2 | 4 |
| 12 | 1 | 24 | 2 | 5 |
| 13 | 1 | 24 | 2 | 6 |
| 14 | 1 | 24 | 2 | 7 |
| 15 | 1 | 24 | 2 | 8 |
| 16 | 1 | 24 | 2 | 9 |
| 17 | 1 | 24 | 2 | 10 |
| 18 | 1 | 24 | 2 | 11 |
| 19 | 1 | 24 | 2 | 12 |
| 20 | 1 | 48 | 1 | 14 |
| 21 | 1 | 48 | 1 | 17 |
| 22 | 1 | 48 | 1 | 20 |
| 23 | 1 | 48 | 1 | 23 |
| 24 | 1 | 48 | 2 | 14 |
| 25 | 1 | 48 | 2 | 17 |
| 26 | 1 | 48 | 2 | 20 |
| 27 | 1 | 48 | 2 | 23 |
| 28 | 1 | 48 | 3 | 14 |
| 29 | 1 | 48 | 3 | 17 |
| 30 | 1 | 48 | 3 | 20 |
| 31 | 1 | 48 | 3 | 23 |

TABLE 7

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 1 | 1 |
| 1 | 1 | 48 | 1 | 6 |
| 2 | 1 | 48 | 1 | 11 |
| 3 | 1 | 48 | 1 | 16 |
| 4 | 1 | 48 | 1 | 21 |
| 5 | 1 | 48 | 1 | 26 |
| 6 | 1 | 48 | 2 | 1 |
| 7 | 1 | 48 | 2 | 6 |
| 8 | 1 | 48 | 2 | 11 |
| 9 | 1 | 48 | 2 | 16 |
| 10 | 1 | 48 | 2 | 21 |
| 11 | 1 | 48 | 2 | 26 |
| 12 | 1 | 48 | 3 | 1 |
| 13 | 1 | 48 | 3 | 6 |
| 14 | 1 | 48 | 3 | 11 |
| 15 | 1 | 48 | 3 | 16 |
| 16 | 1 | 48 | 3 | 21 |
| 17 | 1 | 48 | 3 | 26 |
| 18 | 1 | 96 | 1 | 27 |
| 19 | 1 | 96 | 1 | 38 |
| 20 | 1 | 96 | 1 | 49 |
| 21 | 1 | 96 | 2 | 27 |
| 22 | 1 | 96 | 2 | 38 |
| 23 | 1 | 96 | 2 | 49 |
| 24 | 1 | 96 | 3 | 27 |
| 25 | 1 | 96 | 3 | 38 |
| 26 | 1 | 96 | 3 | 49 |
| 27 | Reserved | | | |
| 28 | Reserved | | | |
| 29 | Reserved | | | |
| 30 | Reserved | | | |
| 31 | Reserved | | | |

TABLE 8

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 1 |
| 1 | 1 | 24 | 2 | 2 |
| 2 | 1 | 24 | 2 | 3 |
| 3 | 1 | 24 | 2 | 4 |
| 4 | 1 | 24 | 2 | 5 |
| 5 | 1 | 24 | 2 | 6 |
| 6 | 1 | 24 | 2 | 7 |
| 7 | 1 | 24 | 2 | 8 |
| 8 | 1 | 24 | 2 | 9 |
| 9 | 1 | 24 | 2 | 10 |
| 10 | 1 | 24 | 2 | 11 |
| 11 | 1 | 24 | 2 | 12 |
| 12 | 1 | 24 | 2 | 13 |
| 13 | 1 | 24 | 2 | 14 |
| 14 | 1 | 48 | 1 | 13 |
| 15 | 1 | 48 | 1 | 16 |
| 16 | 1 | 48 | 1 | 19 |
| 17 | 1 | 48 | 1 | 22 |
| 18 | 1 | 48 | 1 | 25 |
| 19 | 1 | 48 | 2 | 13 |
| 20 | 1 | 48 | 2 | 16 |

TABLE 8-continued

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 21 | 1 | 48 | 2 | 19 |
| 22 | 1 | 48 | 2 | 22 |
| 23 | 1 | 48 | 2 | 25 |
| 24 | 1 | 48 | 3 | 13 |
| 25 | 1 | 48 | 3 | 16 |
| 26 | 1 | 48 | 3 | 19 |
| 27 | 1 | 48 | 3 | 22 |
| 28 | 1 | 48 | 3 | 25 |
| 29 | Reserved | | | |
| 30 | Reserved | | | |
| 31 | Reserved | | | |

Embodiment 6: RMSI PDCCH Monitoring Window Occasion for RMSI Multiplexing Pattern 2

Candidate positions for an SS/PBCH block in a slot are designed in such a manner that the SS/PBCH block is not transmitted in certain OFDM symbols for a DL control region and a UL control region. Further, to enable UL control information transmission in all slots, ODFM symbols #12 and #13 are spared from allocation of SS/PBCH blocks. However, a PDCCH monitoring occasion of RMSI multiplexing pattern 2 with a 240-kHz SCS for an SS/PBCH block and a PDCCH SCS of 120 kHz needs to be configured in OFDM symbols #12 and #13.

For example, a slot index nc for RMSI multiplexing pattern 2 may be given as follows.

0, 1, 2, 3, 0, 1 in i=8k, i=8k+1, i=8k+2, i=8k+3, i=8k+6, and i=8k+7 ($n_c=n_{SSB,i}$)

12, 13 in i=8k+4, i=8k+5 ($n_c=n_{SSB,i}-1$)

In other words, transmission of a UL control channel is not allowed in slots configured for RMSI multiplexing pattern 2 as described above. However, to allow transmission of a UL control channel, SS/PBCH block indexes mapped to OFDM symbols #12 and #13 located at the end of a slot (i.e., i=8k+4 and i=8k+5) may not be used.

In this case, OFDM symbols #0 and #1 located at the start of the slot may be used for an RMSI CORESET mapped to SS/PBCH block indexes (i.e., i=8k+6 and i=8k+7), and the second half of the slot (e.g., ODFM symbol #7 to OFDM symbol #13) may be used for SS/PBCH block transmission. Therefore, when an RACH occasion is configured in the second half of the slot, the RACH occasion may not be valid. The configuration of the RACH occasion in the second half of the slot is intended to allow RACH transmission, when the SS/PBCH block is transmitted in the first half of the slot.

To prevent configuration of an invalid RACH occasion, a new configuration may be considered for a PDCCH monitoring occasion for DL transmission in OFDM symbols #0, #1, #2, and #3 in each slot.

Figure 15:
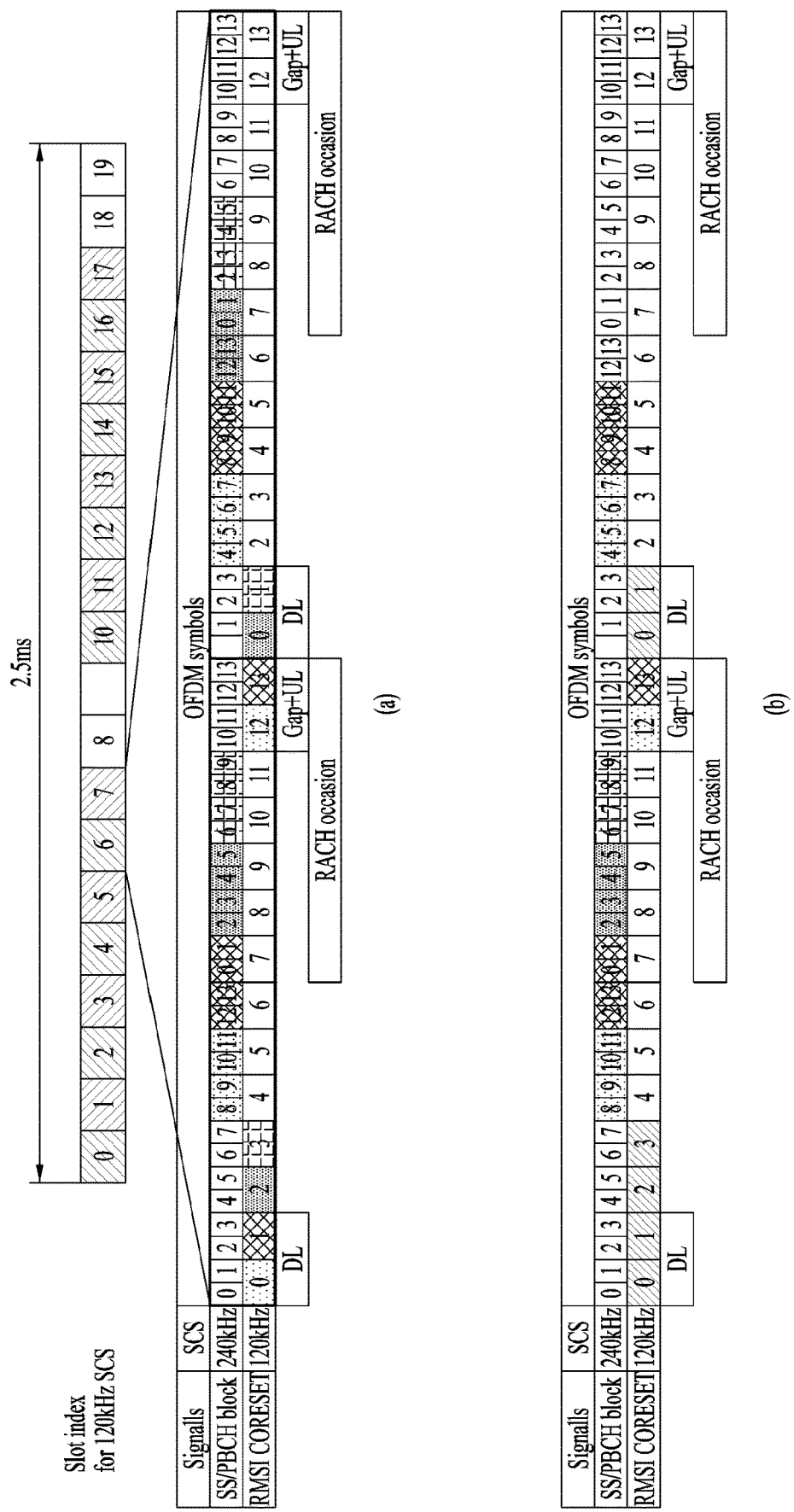
FIG. 15 is a diagram illustrating an exemplary configuration for remaining minimum system information (RMSI) physical downlink control channel (PDCCH) monitoring occasions.

FIG. 15 illustrates RMSI PDCCH monitoring window occasions for RMSI multiplexing pattern 2. Specifically, FIG. 15(a) illustrates a current RMSI PDCCH monitoring window occasion, and FIG. 15(b) illustrates an exemplary new configuration considered to prevent configuration of an invalid RACH occasion.

Referring to FIG. 15(b), the number of OFDM symbols for PDCCH monitoring may be smaller than the number of SS/PBCH blocks included in a slot. Therefore, the number of SS/PBCH blocks may be limited, and the rule of mapping SS/PBCH block indexes in a slot may be changed. For example, OFDM symbols to which SS/PBCH block indexes are mapped may be changed, while the existing one-to-one mapping rule is maintained. In another example, a plurality of SS/PBCH block indexes may be mapped to the same OFDM symbol.

A specific example of limiting the number of SS/PBCH blocks while maintaining the one-to-one mapping rule may be given as follows.

For $N_{symb}^{CORESET}=1$, OFDM symbol indexes 0, 1, 2, 3, 0, 1 in i=8k, i=8k+1, i=8k+2, i=8k+3, i=8k+4, and i=8k+5 ($n_c=n_{SSB,i}$)

Now, a description will be given of an example of allocating a PDSCH region carrying RMSI (hereinafter, referred to as an "RMSI PDSCH" region).

Figure 16:
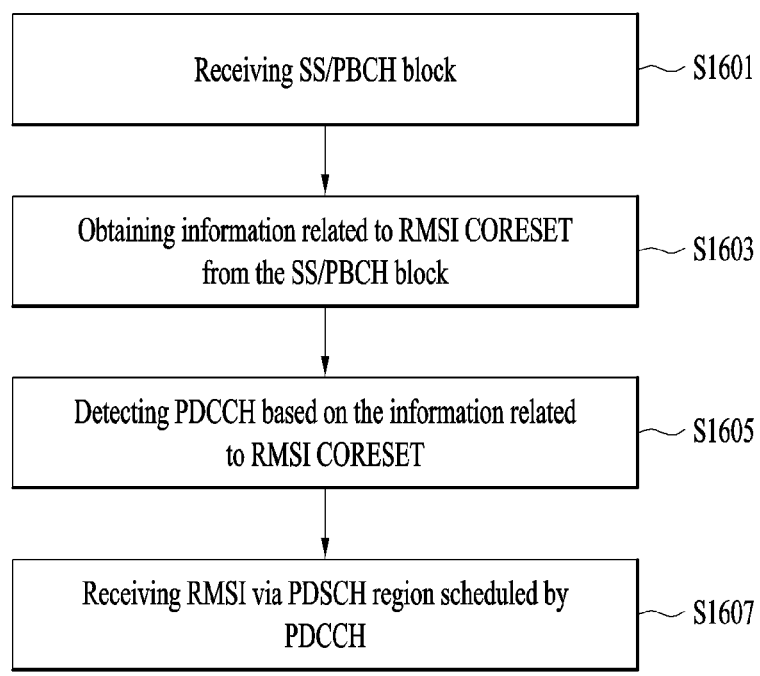
FIGS. 16, 17 and 18 are diagrams illustrating operations of a UE, a base station (BS), and a network according to an embodiment of the present disclosure.
Figure 17:
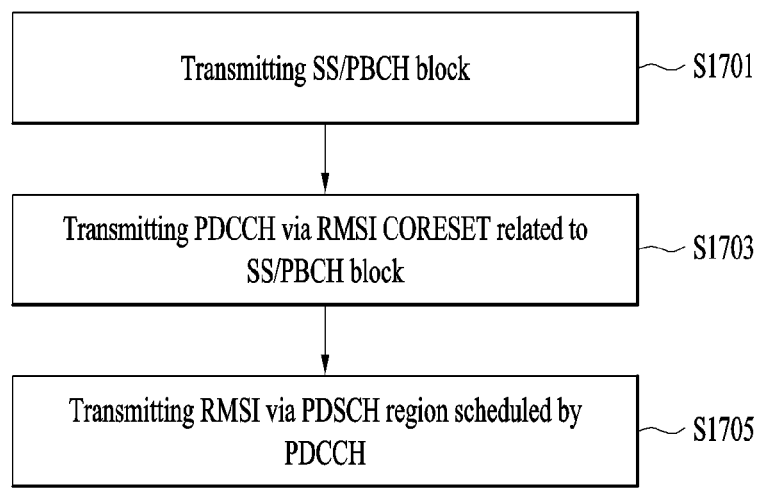
Figure 18:
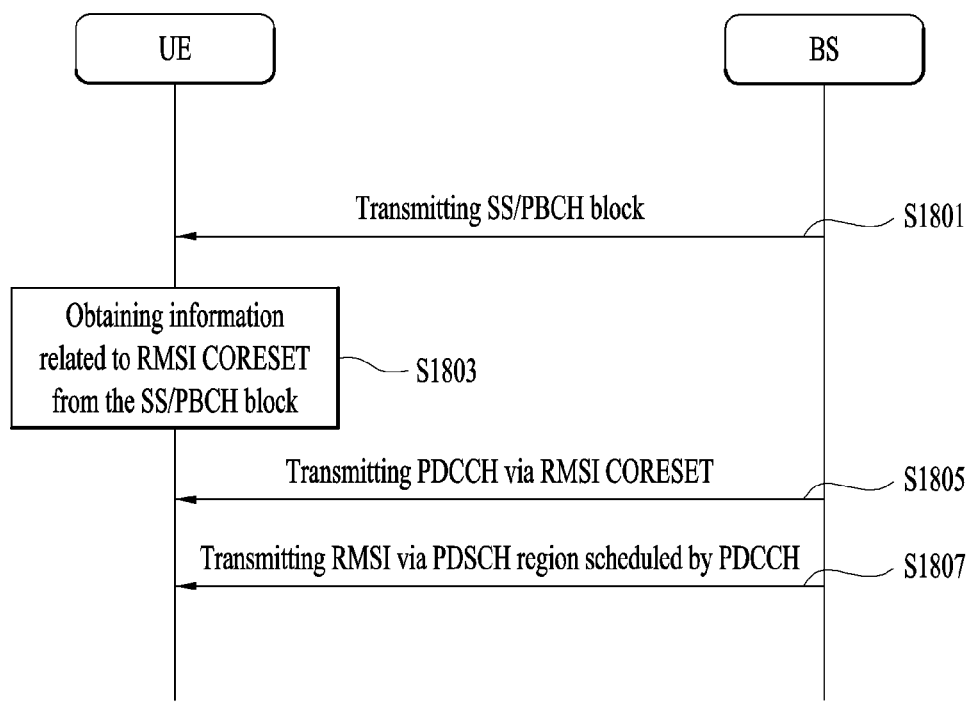

FIGS. 16, 17 and 18 are diagrams illustrating an example of transmitting and receiving RMSI in a UE, a BS, and a network.

Referring to FIG. 16, a UE may receive an SS/PBCH block from a BS (S1601) and obtain an MIB from a PBCH included in the SS/PBCH block. The MIB includes information about a region to which a CORESET related to a PDCCH that schedules an RMSI PDSCH (hereinafter, referred to as "RMSI CORESET") is allocated. Accordingly, the UE may obtain the information related to the allocated RMSI CORESET region by obtaining the MIB (S1603). The RMSI CORESET may be associated with the SS/PBCH block received by the UE. The UE may detect the PDCCH in the RMSI CORESET region (S1604), and receive RMSI in an RMSI PDSCH region scheduled by the PDCCH (S1607). An example of the RMSI PDSCH region scheduled by the PDCCH may be based on Embodiment 7 and Embodiment 8. In other words, the RMSI PDSCH region may be allocated based on Embodiment 7 and Embodiment 8 described below.

Specifically, the frequency area of the RMSI PDSCH may be allocated based on Embodiment 7, and the time area of the RMSI PDSCH may be allocated based on Embodiment 8.

Referring to FIG. 17, a BS may transmit an SS/PBCH block to a UE (S1701). A PBCH included in the SS/PBCH block transmitted by the BS may include an MIB. The MIB may include information about a region to which an RMSI CORESET associated with the SS/PBCH block is allocated. Therefore, the BS may transmit a PDCCH in the allocated RMSI CORESET region (S1703). RMSI may be transmitted in an allocated RMSI PDSCH region based on information about the allocated RMSI PDSCH region included in the PDCCH (S1705). The information about the allocated RMSI PDSCH region may be configured based on Embodiment 7 and Embodiment 8 described below.

Specifically, the frequency area of the RMSI PDSCH may be allocated based on Embodiment 7, and the time area of the RMSI PDSCH may be allocated based on Embodiment 8.

A network operation according to an embodiment of the present disclosure will be described with reference to FIG. 18. A BS may transmit an SS/PBCH block to a UE (S1801). The UE may receive the SS/PBCH block from the BS and obtain an MIB from a PBCH included in the SS/PBCH block. The MIB includes information about a region to which a CORESET related to a PDCCH that schedules an RMSI PDSCH (hereinafter, referred to as "RMSI CORESET") is allocated. Accordingly, the UE may obtain the information related to the allocated RMSI CORESET region by obtaining the MIB (S1803). The RMSI CORESET may be associated with the SS/PBCH block received by the UE. The BS may transmit the PDCCH in the region to which the RMSI CORESET is allocated (S1805). RMSI may be transmitted in an allocated RMSI PDSCH region based on information on the allocated RMSI PDSCH region, included in the PDCCH (S1807). The information about the allocated RMSI PDSCH region may be configured based on Embodiment 7 and Embodiment 8 described below.

Specifically, the frequency area of the RMSI PDSCH may be allocated based on Embodiment 7, and the time area of the RMSI PDSCH may be allocated based on Embodiment 8.

Embodiment 7: Bandwidth of Initial Active DL BWP

Figure 19:
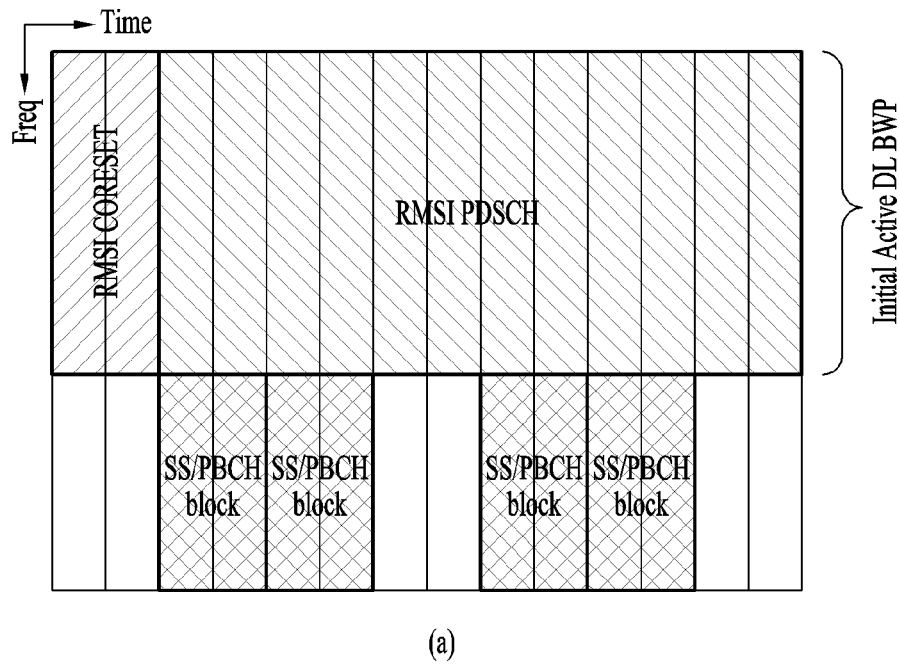
FIG. 19 is a diagram illustrating an example of configuring an initial active bandwidth part (BWP).
Figure 19:
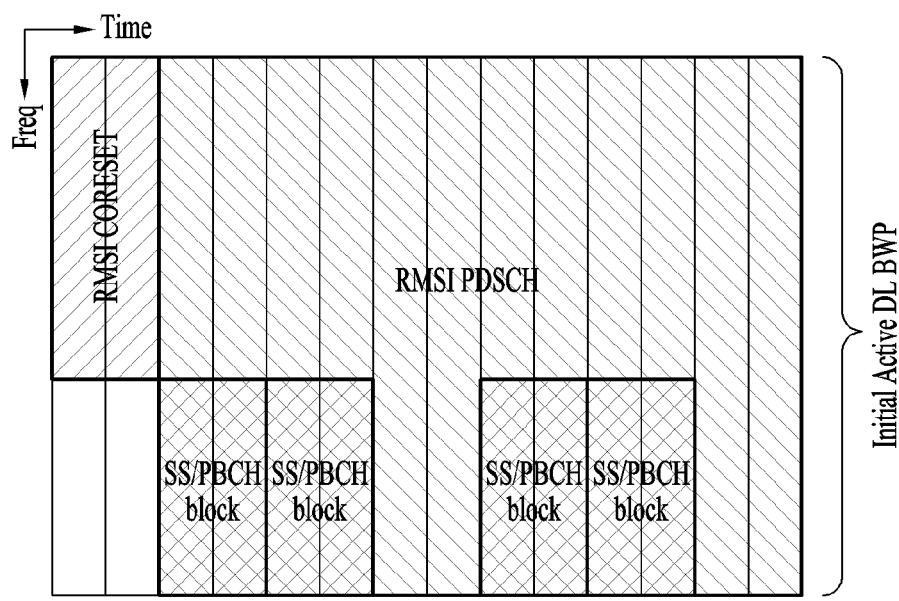

With reference to FIG. 19, a method of configuring the bandwidth of an initial active DL BWP will be described. FIGS. 19(a) and 19(b) illustrate examples in which an SS/PBCH block, an RMSI CORESET, and an RMSI PDSCH are allocated in one symbol including 14 OFDM symbols.

During an initial synchronization procedure including cell ID detection and PBCH decoding, the UE attempts to detect a signal in the bandwidth of an SS/PBCH block. The UE may then continue to perform the following procedures for initial access, such as system information acquisition and an RACH procedure within an initial active DL/UL bandwidth.

An initial active DL BWP is defined based on the frequency position of an RMSI CORESET, the bandwidth of the RMSI CORESET, and the numerology of RMSI. In RMSI multiplexing pattern 1, an SS/PBCH block, an RMSI CORESET, and an RMSI PDSCH may be transmitted in the initial active DL BWP.

However, transmission of the SS/PBCH block is not limited to the initial active DL BWP in RMSI multiplexing pattern 2 and RMSI multiplexing pattern 3. In other words, the SS/PBCH block may also be transmitted in a frequency area other than the initial active BWP in RMSI multiplexing pattern 2 and RMSI multiplexing pattern 3.

In this regard, PDSCH scheduling may be restricted in RMSI multiplexing pattern 2 and RMSI multiplexing pattern 3. Referring to FIG. 19(a), according to the current definition of an initial active DL BWP, even though the network uses a wide frequency range for transmission of an SS/PBCH block and an RMSI CORESET, the BS is not allowed to allocate a frequency band for SS/PBCH transmission as frequency resources for PDSCH transmission.

In other words, the frequency band for RMSI PDSCH transmission is limited to the initial active DL BWP, and even though the SS/PBCH block is transmitted in a frequency area other than the initial active DL BWP, the RMSI PDSCH may not be scheduled to be transmitted in the frequency area.

Therefore, the definition of an initial active BWP may be changed for flexible PDSCH scheduling. When the bandwidth of the initial active DL BWP is determined, a UE implementation issue such as RF readjustment is considered. However, based on a 200-MHz UE minimum bandwidth for frequency range 2 (FR2) at or above 6 GHz, RF readjustment at the UE level is not required in RMSI multiplexing pattern 2 and RMSI multiplexing pattern 3. Therefore, in RMSI multiplexing pattern 2 and RMSI multiplexing pattern 3, the bandwidth of an initial active DL BWP may be defined as (bandwidth of RMSI CORESET+bandwidth of gap+bandwidth of SS/PBCH block), as illustrated in FIG. 19(b). Specifically, the gap may refer to a certain frequency range between the bandwidth of the RMSI CORESET and the bandwidth of the SS/PBCH block. That is, the initial active DL BWP may be set to be equal to or greater than the sum of the bandwidth of the RMSI CORESET and the bandwidth of the SS/PBCH block in RMSI multiplexing pattern 2 and RMSI multiplexing pattern 3. Accordingly, the RMSI PDSCH may be transmitted in a frequency area greater than or equal to the bandwidth of the RMSI CORESET and/or the bandwidth of the SS/PBCH block.

In particular, referring to FIG. 19(b), since allocation of the RMSI PDSCH even in the bandwidth of the SS/PBCH block is allowed, the RMSI PDSCH may be transmitted in a time period during which the SS/PBCH block is not transmitted within the bandwidth of the SS/PBCH block. For example, the RMSI PDSCH may be transmitted in a region other than a candidate SS/PBCH block region available for transmission of the SS/PBCH block. Further, even in the candidate SS/PBCH block region, the RMSI PDSCH may be transmitted in a region where the SS/PBCH block is not actually transmitted.

Embodiment 8: Allocation of RMIS PDSCH Time Area for RMSI Multiplexing Pattern 2

Figure 20:
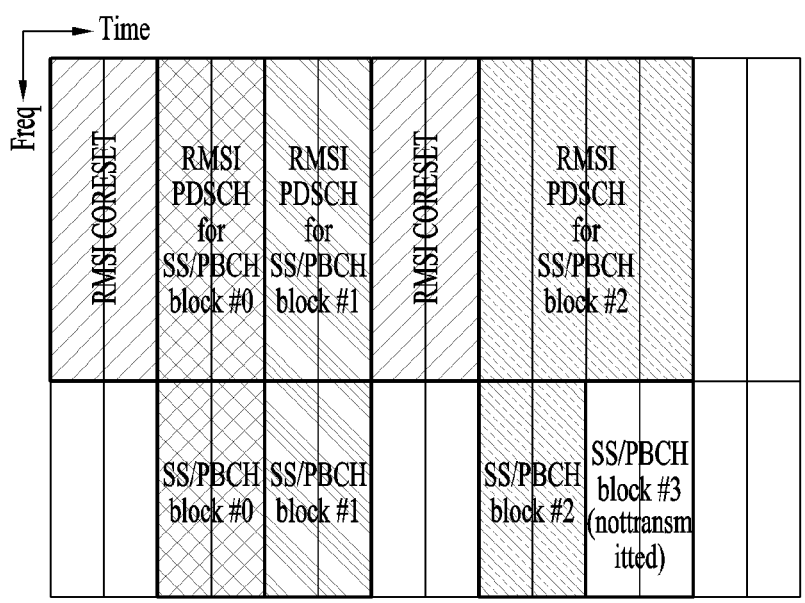
FIG. 20 is a diagram illustrating an example of allocating an RMSI physical downlink shared channel (PDSCH) region.

With reference to FIG. 20, a method of allocating an RMSI PDSCH time area for RMSI multiplexing pattern 2 will be described. FIG. 20 illustrates an example of allocating an SS/PBCH block, an RMSI CORESET, and an RMSI PDSCH in one symbol including 14 OFDM symbols.

A 4-bit table for resource allocation of an RMSI PDSCH time area is described in 3GPP technical specification 38.214. A table related to RMSI PDSCH resource allocation is defined for each RMSI multiplexing pattern (pattern 1, pattern 2, and pattern 3), and includes start information such as a starting symbol and an OFDM symbol length to which a PDSCH is allocated. Particularly, according to an existing table related to RMSI PDSCH resource allocation, an OFDM symbol length for an RMSI PDSCH is limited to 2 (L=2) in RMSI multiplexing pattern 2. In other words, in RMSI multiplexing pattern 2, only two OFDM symbols may be allocated for one RMSI PDSCH.

However, the limitation of the OFDM symbol length for the RMSI PDSCH may degrade performance related to a coding rate. Further, if the number of actually transmitted SS/PBCH blocks is less than an allowed maximum number of SS/PBCH blocks, OFDM symbols that are not multiplexed with the SS/PBCH block may be used to transmit the RMSI PDSCH.

Referring to FIG. 20, if SS/PBCH block #3 is not actually transmitted, four consecutive OFDM symbols may be used for actually transmitted SS/PBCH block #2. In other words, if SS/PBCH block #3 has been actually transmitted, two OFDM symbols available for an RMSI PDSCH associated with SS/PBCH block #3 may be used for SS/PBCH block #2. That is, four consecutive OFDM symbols may be used for RMSI PDSCH transmission on the same analog beam.

Therefore, more entries may be added to the resource allocation table related to RMSI multiplexing pattern 2 to allow allocation of two or more OFDM symbols for the RMSI PDSCH. In the resource allocation table related to RMSI multiplexing pattern 2, at least an entry with an OFDM symbol length L=4 needs to be added. In other words, in RMSI multiplexing pattern 2, two OFDM symbols associated with the RMSI PDSCH of an SS/PBCH block that is not actually transmitted may be additionally used for the RMSI PDSCH of another SS/PBCH block which is actually transmitted. In this case, the actually transmitted SS/PBCH block may have an index contiguous to that of the SS/PBCH block which is not actually transmitted.

However, the present disclosure is not limited thereto, and the index of the actually transmitted SS/PBCH block may not be contiguous to that of the SS/PBCH block which is not actually transmitted.

Figure 21:
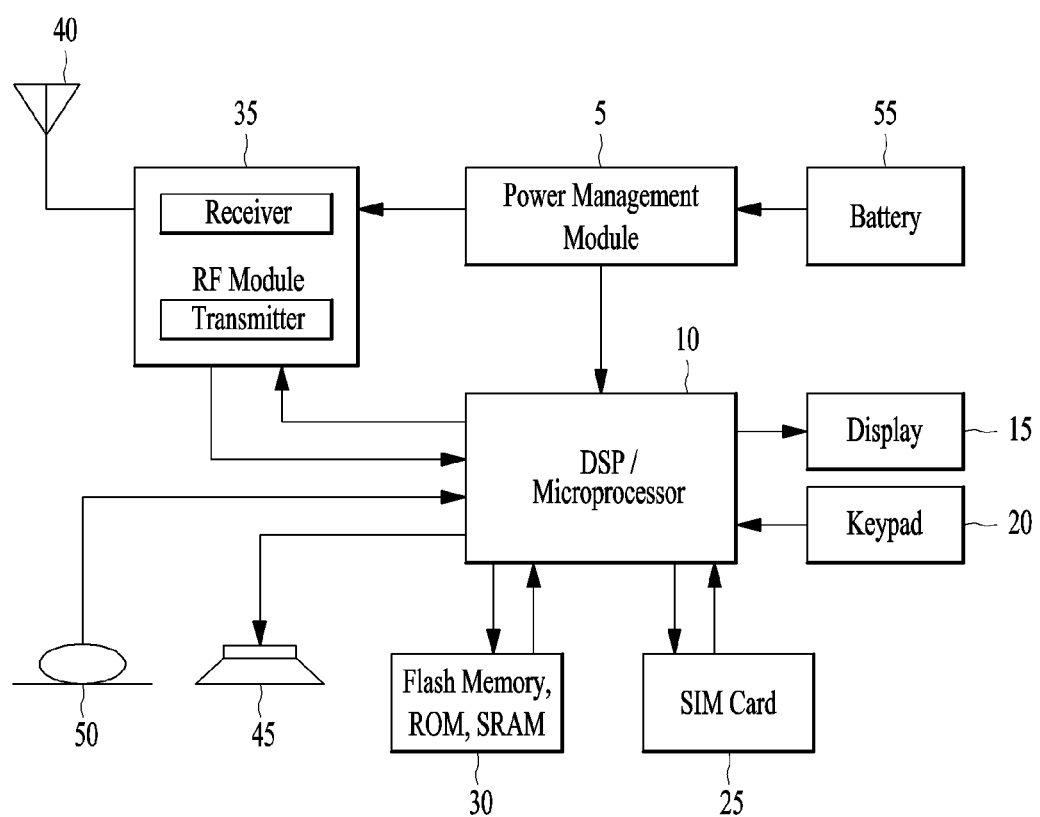
FIG. 21 is a block diagram illustrating components of a wireless device that implements the present disclosure.

FIG. 21 illustrates an exemplary wireless communication device according to an embodiment of the present disclosure.

The wireless communication device illustrated in FIG. 21 may be a UE and/or a BS according to an embodiment of the present disclosure. However, the wireless communication device of FIG. 13 may be replaced with any of various types of devices, such as a vehicle communication system or device, a wearable device, a laptop, a smartphone, and so on, not limited to the UE and/or the BS according to the embodiment of the present disclosure. More specifically, the wireless communication device may be any of a BS, a network node, a transmitting UE, a receiving UE, a wireless device, a wireless communication apparatus, a vehicle, a vehicle equipped with an autonomous driving function, an unmanned aerial vehicle (UAV), an artificial intelligence (AI) module, a robot, an AR device, a VR device, an MTC device, an IoT device, medical equipment, a FinTech device (or financial device), a security device, a weather/environmental device, and a device related to fourth industrial revolution fields or 5G services. For example, the UAV may be an unmanned aircraft flying according to a wireless control signal. For example, the MTC device and the IoT device do not need direct human intervention or manipulation, including a smart meter, a vending machine, a thermometer, a smart bulb, a door lock, and various sensors. For example, the medical equipment refers to a device designed to diagnose, remedy, alleviate, treat, or prevent diseases or a device that examines, replaces or modifies a structure or function, including diagnosis equipment, a surgery device, an (in vitro) diagnostic kit, a hearing aid, and a procedure device. For example, the security device is installed to prevent probable dangers and maintain safety, including a camera, a closed-circuit television (CCTV), and a black box. For example, the FinTech device is a device that provides financial services such as mobile payment, including a payment device and point of sales (POS) terminal. For example, the weather/environmental device may refer to a device that monitors and predicts weather/environment.

Further, the transmitting UE and the receiving UE may include a portable phone, a smartphone, a laptop computer, a digital broadcasting terminal, a personal digital assistant (PDA), a portable multimedia player (PMP), a navigator, a slate personal computer (PC), a tablet PC, an ultrabook, a wearable device (e.g., a smart watch, smart glasses, a head-mounted display (HMD)), and a foldable device. For example, the HMD is a display device wearable on the head, which may be used to implement VR or AR.

Referring to FIG. 21, a UE and/or a BS according to an embodiment of the present disclosure includes at least one processor 10 such as a digital signal processor (DSP) or a microprocessor, a transceiver 35, a power management module 5, an antenna 40, a battery 55, a display 15, a keypad 20, a memory 30, a subscriber identity module (SIM) card 25, a speaker 45, and a microphone 50. The UE and/or the BS may include a single antenna or multiple antennas. The transceiver 35 may also be referred to as an RF module.

The at least one processor 10 may be configured to implement the functions, procedures and/or methods described with reference to FIGS. 1 to 20. In at least one of the embodiments described with reference to FIGS. 1 to 20, the at least one processor 10 may implement one or more protocols, such as layers of radio interface protocols (e.g., functional layers).

The memory 30 is coupled to the at least one processor 10 and stores information related to the operation of the at least one processor 10. The memory 30 may be located inside or outside at least one processor 10 and coupled to the at least one processor 10 by various techniques such as wired or wireless communication.

A user may input various types of information (for example, instruction information such as a telephone number) by various techniques such as pressing a button on the keypad 20 or activating voice using the microphone 50. The at least one processor 10 performs appropriate functions such as receiving and/or processing information of the user and dialing a telephone number.

Further, the at least one processor 10 may retrieve data (e.g., operational data) from the SIM card 25 or the memory 30 to perform the appropriate functions. In addition, the at least one processor 10 may receive and process global positioning system (GPS) information from a GPS chip to obtain location information about the UE and/or the BS, such as information for vehicle navigation, map service, or the like, or perform functions related to the location information. Further, the at least one processor 10 may display these various types of information and data on the display 15, for reference and user convenience.

The transceiver 35 is coupled to the at least one processor 10 to transmit and/or receive wireless signals, such as RF signals. The at least one processor 10 may control the transceiver 35 to initiate communication and transmit wireless signals including various types of information or data, such as voice communication data. The transceiver 35 may include a receiver for receiving a wireless signal and a transmitter for transmitting a wireless signal. The antenna 40 facilitates the transmission and reception of wireless signals. In some embodiments, upon receipt of a wireless signal, the transceiver 35 may forward and convert the signal to a baseband frequency for processing of the at least one processor 10. The processed signal may be processed according to various techniques, such as being converted into audible or readable information, and output through the speaker 45.

In some embodiments, a sensor may also be coupled to the at least one processor 10. The sensor may include one or more sensing devices configured to detect various types of information, including velocity, acceleration, light, vibration, and so on. The at least one processor 10 receives and processes sensing information obtained from the sensor such as proximity, location, image, and so on, thereby executing various functions such as collision avoidance and autonomous driving.

Various components such as a camera and a universal serial bus (USB) port may be further included in the UE and/or the BS. For example, a camera may be further coupled to the at least one processor 10 to be used for a variety of services such as autonomous driving and vehicle safety services.

FIG. 21 merely illustrates an embodiment of devices included in a UE and/or a BS, not limiting the present disclosure. For example, some components, such as the keypad 20, the GPS chip, the sensor, the speaker 45, and/or the microphone 50 may be excluded from implementation of the UE and/or the BS in some embodiments.

Specifically, an operation of the wireless communication device illustrated in FIG. 21 as a UE to implement the embodiments of the present disclosure will be described. If the wireless communication device is a UE according to an embodiment of the present disclosure, the processor 10 may control the transceiver 35 to receive an SS/PBCH block from a BS and obtain an MIB from a PBCH included in the SS/PBCH block. The MIB includes information about an allocated region of a CORESET related to a PDCCH that schedules an RMSI PDSCH (hereinafter, referred to as an "RMSI CORESET"). Therefore, the processor 10 may obtain the information about the allocated region of the RMSI CORESET by obtaining the MIB. The RMSI CORESET may be associated with the SS/PBCH block that the processor 10 has controlled the transceiver 35 to receive. The processor 10 may detect the PDCCH in the RMSI CORESET region and control the transceiver 35 to receive RMSI in an RMSI PDSCH region scheduled by the PDCCH. An example of the RMSI PDSCH region scheduled by the PDCCH may be based on Embodiment 7 and Embodiment 8. That is, the RMSI PDSCH region may be allocated according to Embodiment 7 and Embodiment 8.

Specifically, the frequency region of the RMSI PDSCH may be allocated according to Embodiment 7, and the time region of the RMSI PDSCH may be allocated according to Embodiment 8.

If the wireless communication device illustrated in FIG. 21 is a BS according to an embodiment of the present disclosure, the processor 10 may control the transceiver 35 to transmit an SS/PBCH block to a UE. A PBCH included in the SS/PBCH block transmitted by the BS may include an MIB. The MIB may include information about an allocated region of an RMSI CORESET associated with the SS/PBCH block. Therefore, the processor 10 may control the transceiver 35 to transmit a PDCCH in the allocated region of the RMSI CORESET. Further, the processor 10 may control the transceiver 35 to transmit RMSI in an allocated RMSI PDSCH region based on information about the allocated RMSI PDSCH region included in the PDCCH. The information about the allocated region of the RMSI PDSCH may be configured based on Embodiment 7 and Embodiment 8. Specifically, the frequency region of the RMSI PDSCH may be configured according to Embodiment 7, and the time region of the RMSI PDSCH may be configured according to Embodiment 8.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'access point (AP)', and so on.

The embodiments of the present disclosure may be achieved by various means, for example, hardware, firmware, software, or a combination thereof. In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and so on.

In a firmware or software configuration, an embodiment of the present disclosure may be implemented in the form of a module, a procedure, a function, and so on. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method and apparatus for transmitting and receiving system information have been described above in the context of being applied to a 5G NR system, the present disclosure is applicable to various wireless communication systems other than the 5G NR system.

The invention claimed is:

1. A method of receiving remaining minimum system information (RMSI) by a user equipment (UE) in a wireless communication system, the method comprising:
   receiving a first synchronization signal/physical broadcast channel (SS/PBCH) block;
   obtaining information related to a control resource set (CORESET) from the first SS/PBCH block; and
   receiving RMSI in a region for a physical downlink shared channel (PDSCH) obtained based on the CORESET,
   wherein when the first SS/PBCH block is multiplexed with the CORESET based on multiplexing pattern 2, a time period of the region for the PDSCH spans two or four symbols, and
   wherein the time period of the region for the PDSCH includes at least one symbol associated with the first SS/PBCH block and at least one symbol associated with a second SS/PBCH block which is not actually transmitted.

2. The method according to claim 1, wherein a first frequency region for the PDSCH includes a second frequency region for the first SS/PBCH block, and a third frequency region for the CORESET.

3. The method according to claim 2, wherein the RMSI is received in a time region in which no SS/PBCH block is transmitted in a time region included in the second frequency region.

4. The method according to claim 2, wherein a specific frequency gap is allocated between the second frequency region and the third frequency region.

5. The method according to claim 2, wherein the first frequency region is an initial active downlink bandwidth part.

6. The method according to claim 1, wherein a first symbol of the first SS/PBCH block is identical to a starting symbol of the PDSCH.

7. The method according to claim 1, wherein an index of the first SS/PBCH block and an index of the second SS/PBCH block are contiguous to each other.

8. The method according to claim 1, wherein the UE is communicable with at least one of another UE, a network, a base station, or an autonomous driving vehicle.

9. An apparatus for receiving remaining minimum system information (RMSI) in a wireless communication system, the apparatus comprising:
- at least one processor; and
- at least one computer memory operably connectable to the at least one processor and storing instructions that, when executed, cause the at least one processor to perform operations comprising:
- receiving a synchronization signal/physical broadcast channel (SS/PBCH) block;
- obtaining information related to a control resource set (CORESET) from the SS/PBCH block; and
- receiving RMSI in a region for a physical downlink shared channel (PDSCH) obtained based on the CORESET, and
- wherein when the SS/PBCH block is multiplexed with the CORESET based on multiplexing pattern 2, a time period of the region for the PDSCH spans two or four symbols, and
- wherein the time period of the region for the PDSCH includes at least one symbol associated with the first SS/PBCH block and at least one symbol associated with a second SS/PBCH block which is not actually transmitted.

10. A user equipment (UE) for receiving remaining minimum system information (RMSI) in a wireless communication system, the UE comprising:
- at least one transceiver;
- at least one processor; and
- at least one computer memory operably connectable to the at least one processor and storing instructions that, when executed, cause the at least one processor to perform operations comprising:
- receiving a synchronization signal/physical broadcast channel (SS/PBCH) block through the at least one transceiver;
- obtaining information related to a control resource set (CORESET) from the SS/PBCH block; and
- receiving RMSI in a region for a physical downlink shared channel (PDSCH) obtained based on the CORESET through the at least one transceiver, and
- wherein when the SS/PBCH block is multiplexed with the CORESET based on multiplexing pattern 2, a time period of the region for the PDSCH spans two or four symbols, and
- wherein the time period of the region for the PDSCH includes at least one symbol associated with the first SS/PBCH block and at least one symbol associated with a second SS/PBCH block which is not actually transmitted.

11. A method of transmitting remaining minimum system information (RMSI) by a base station (BS) in a wireless communication system, the method comprising:
- transmitting a synchronization signal/physical broadcast channel (SS/PBCH) block including information related to a control resource set (CORESET); and
- transmitting RMSI in a region for a physical downlink shared channel (PDSCH) scheduled based on the CORESET,
- wherein when the first SS/PBCH block is multiplexed with the CORESET based on multiplexing pattern 2, a time period of the region for the PDSCH spans two or four symbols, and
- wherein the time period of the region for the PDSCH includes at least one symbol associated with the first SS/PBCH block and at least one symbol associated with a second SS/PBCH block which is not actually transmitted.

12. A base station (BS) for transmitting remaining minimum system information (RMSI) in a wireless communication system, the BS comprising:
- at least one transceiver;
- at least one processor; and
- at least one computer memory operably connectable to the at least one processor and storing instructions that, when executed, cause the at least one processor to perform operations comprising:
- transmitting a synchronization signal/physical broadcast channel (SS/PBCH) block including information related to a control resource set (CORESET) through the at least one transceiver; and
- transmitting RMSI in a region for a physical downlink shared channel (PDSCH) scheduled based on the CORESET through the at least one transceiver, and
- wherein when the first SS/PBCH block is multiplexed with the CORESET based on multiplexing pattern 2, a time period of the region for the PDSCH spans two or four symbols, and
- wherein the time period of the region for the PDSCH includes at least one symbol associated with the first SS/PBCH block and at least one symbol associated with a second SS/PBCH block which is not actually transmitted.

* * * * *